Figure 26:
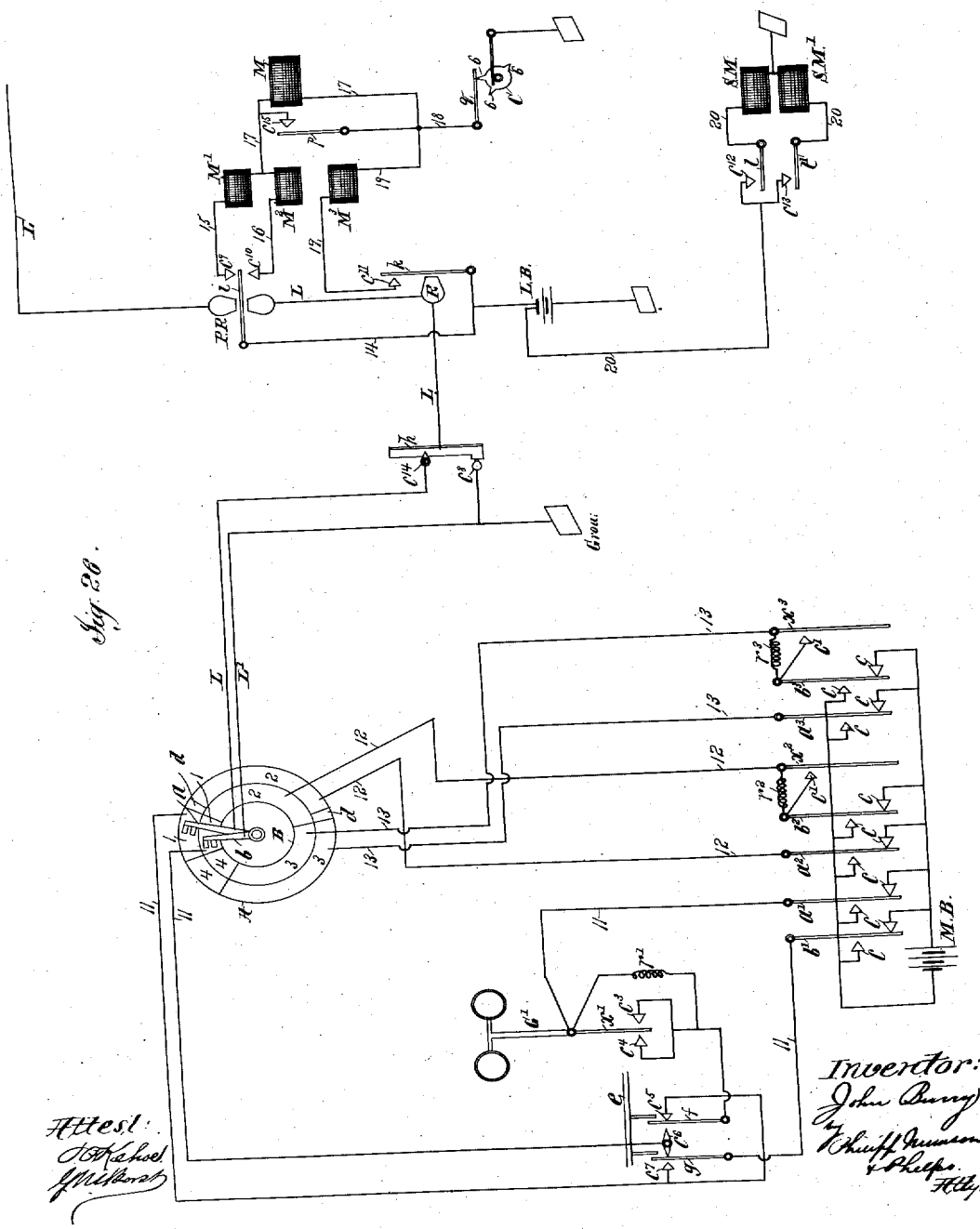

No. 811,127. PATENTED JAN. 30, 1906.
J. BURRY.
TELEGRAPHY AND TELEGRAPH APPARATUS.
APPLICATION FILED OCT. 7, 1893.
8 SHEETS—SHEET 1.
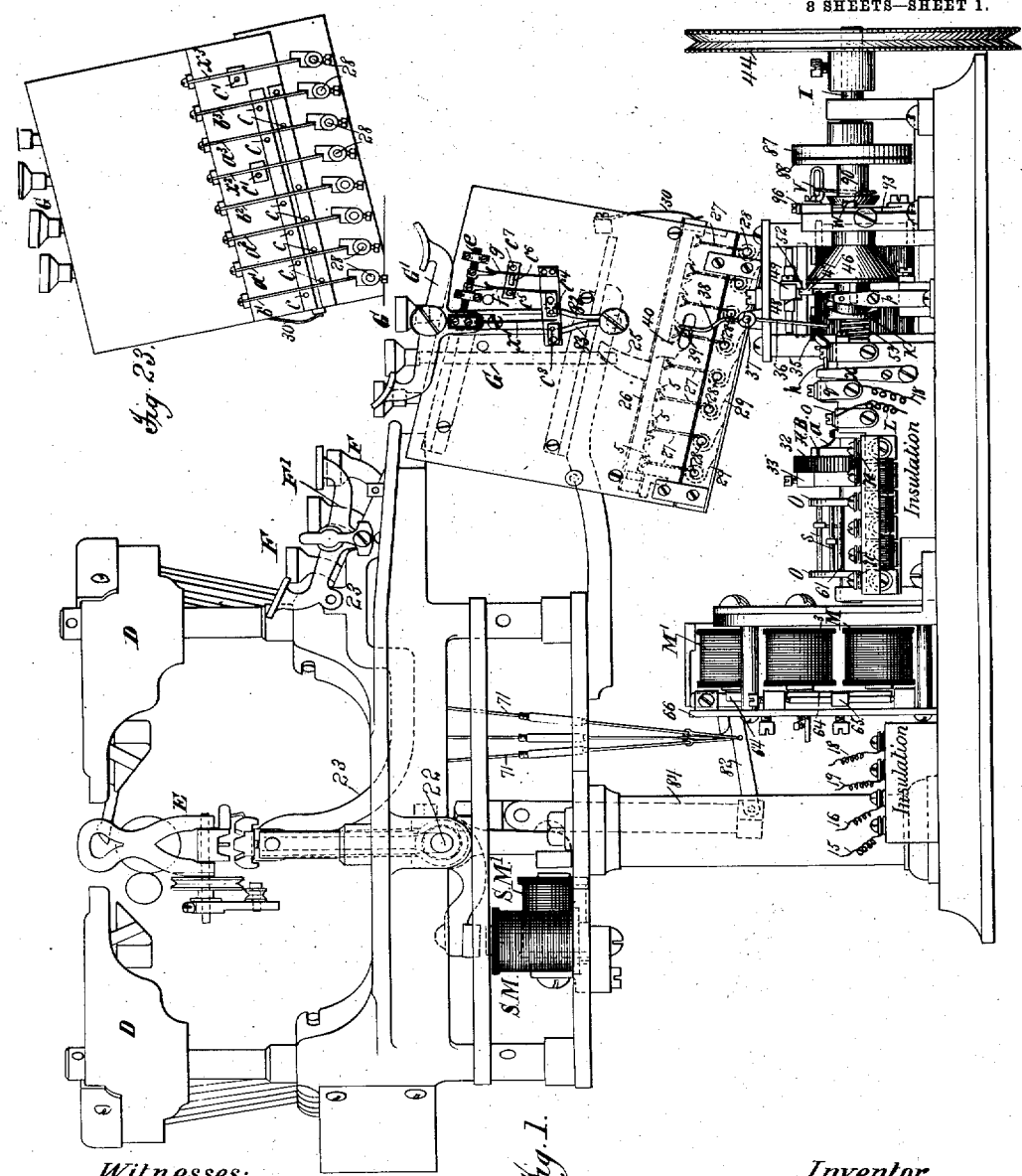
Witnesses:
Inventor
John Burry

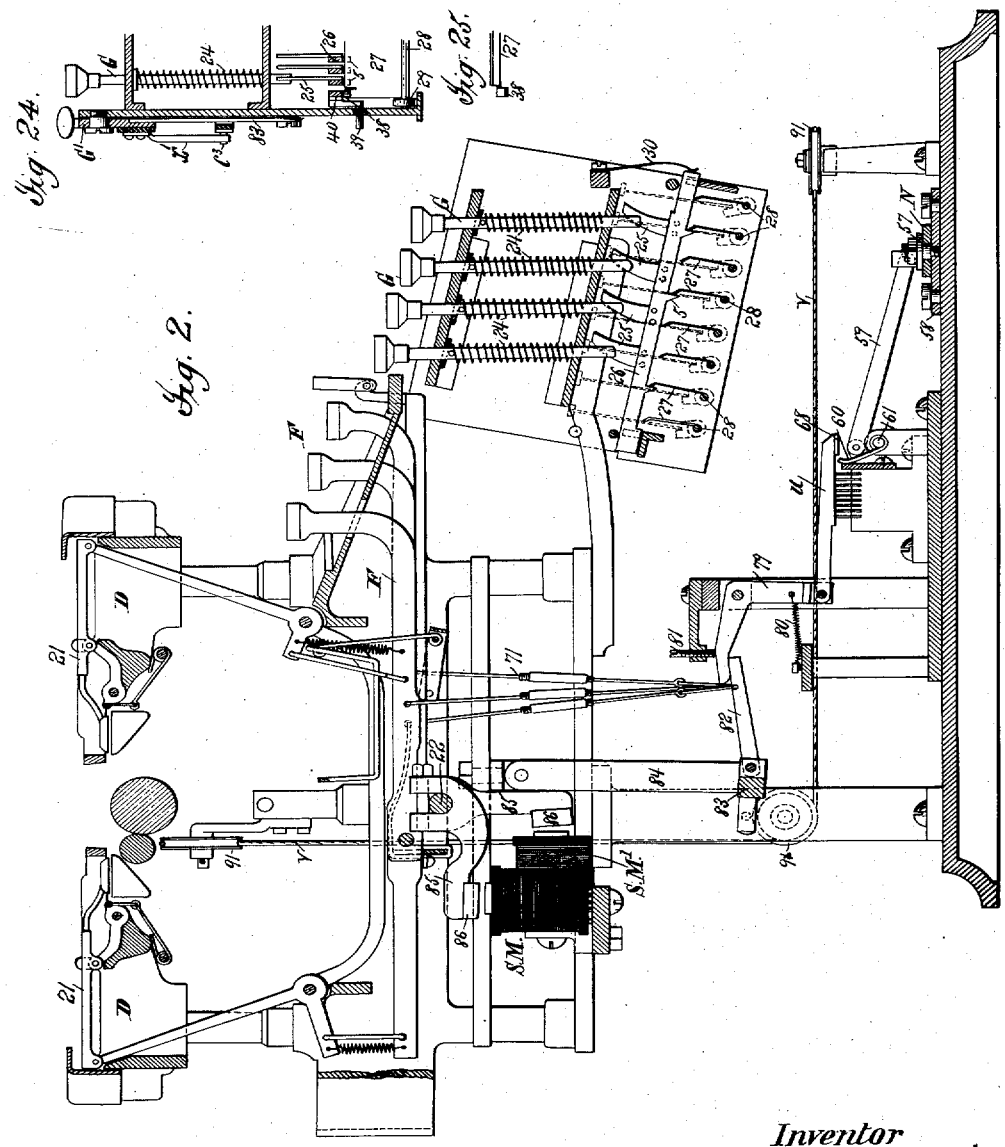

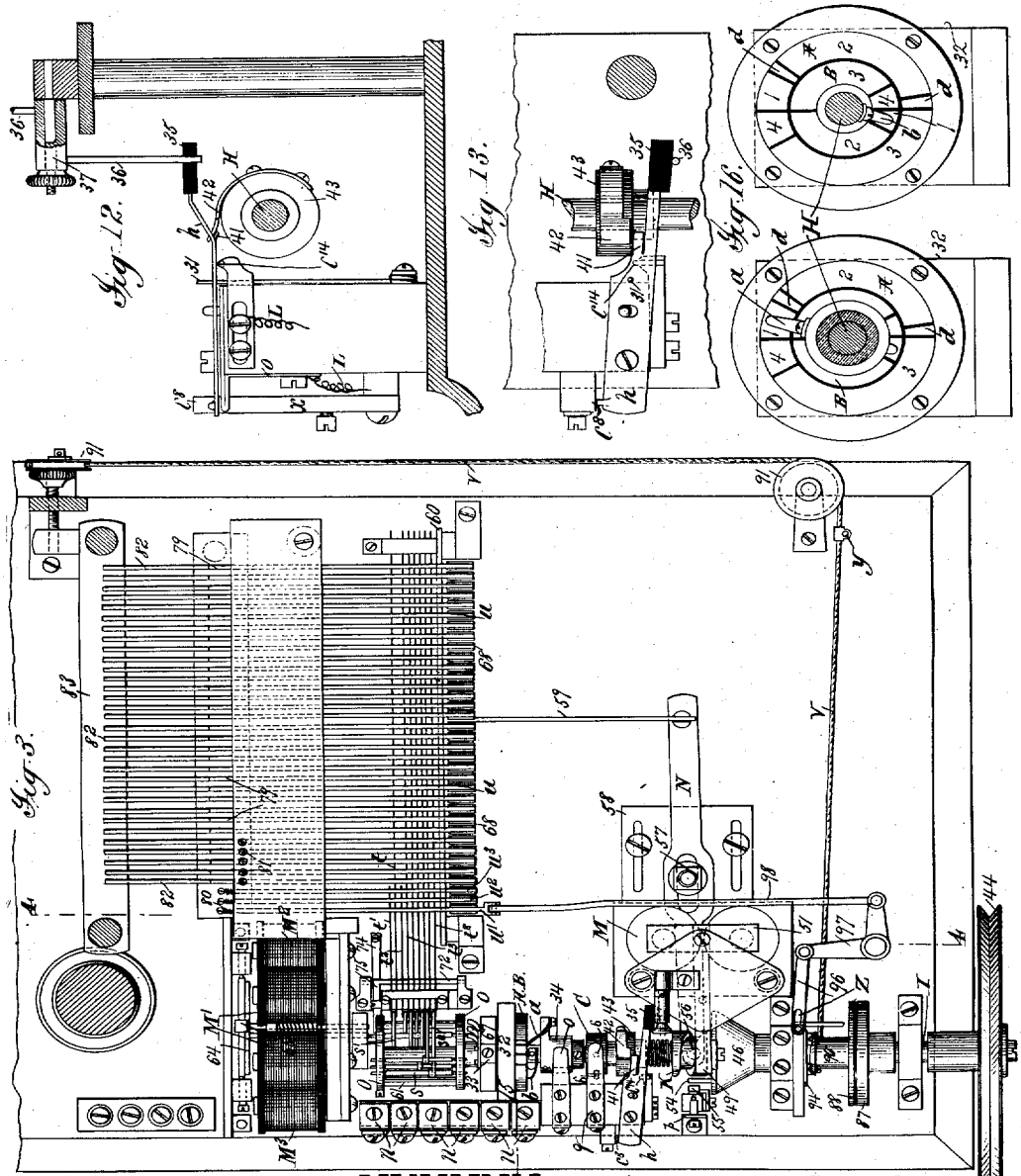

No. 811,127. PATENTED JAN. 30, 1906.
J. BURRY.
TELEGRAPHY AND TELEGRAPH APPARATUS.
APPLICATION FILED OCT. 7, 1893.
8 SHEETS—SHEET 4.
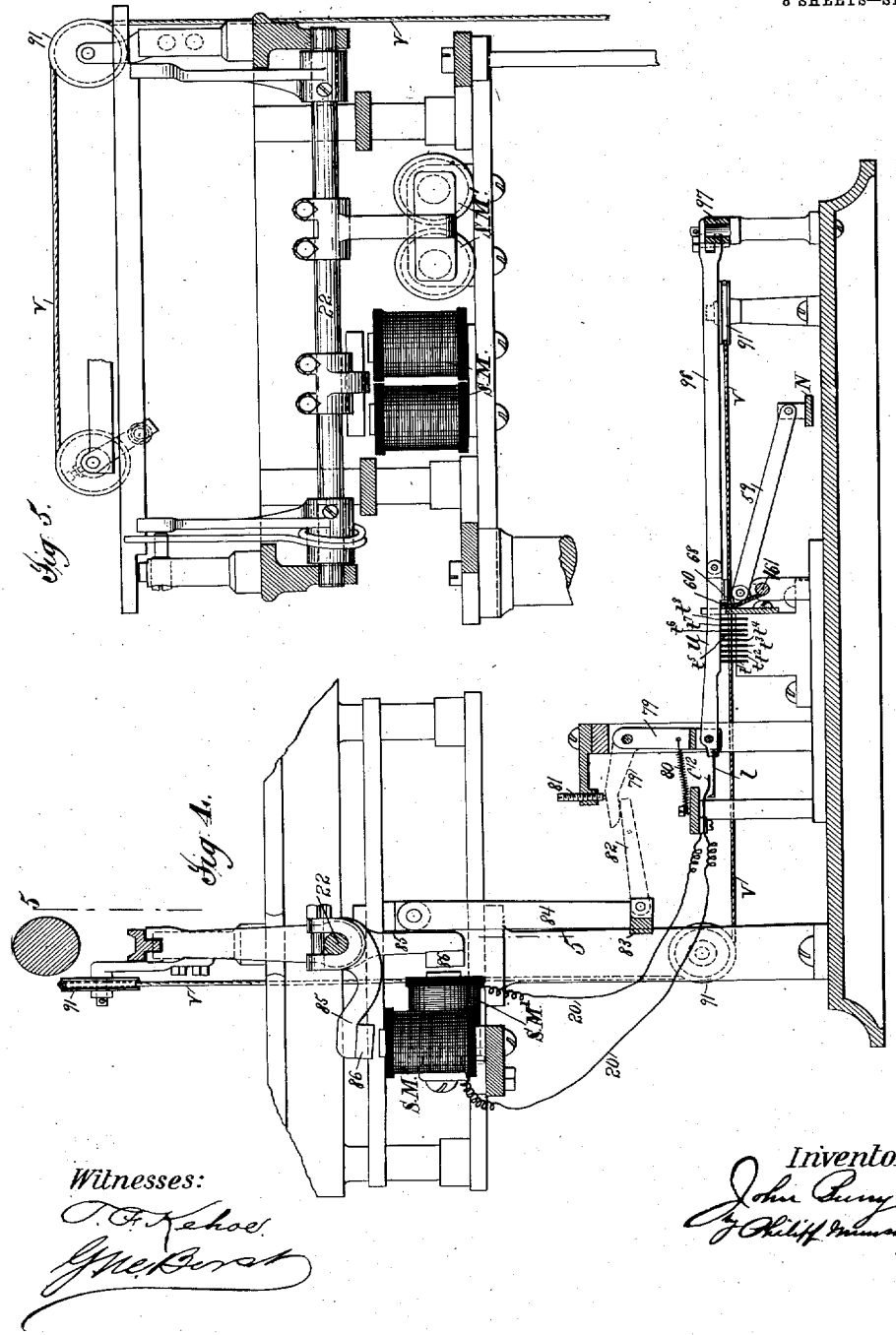
Witnesses:
Inventor

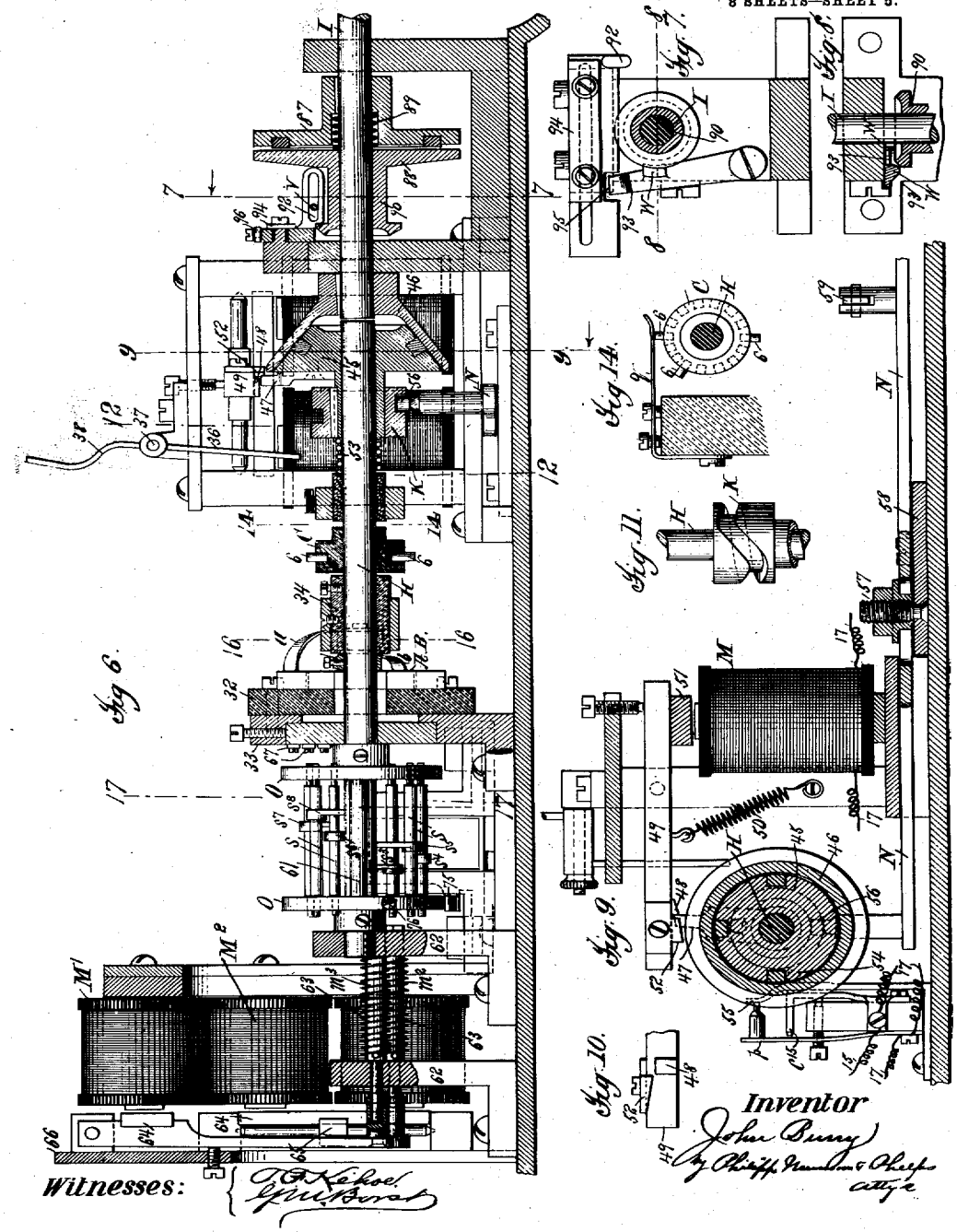

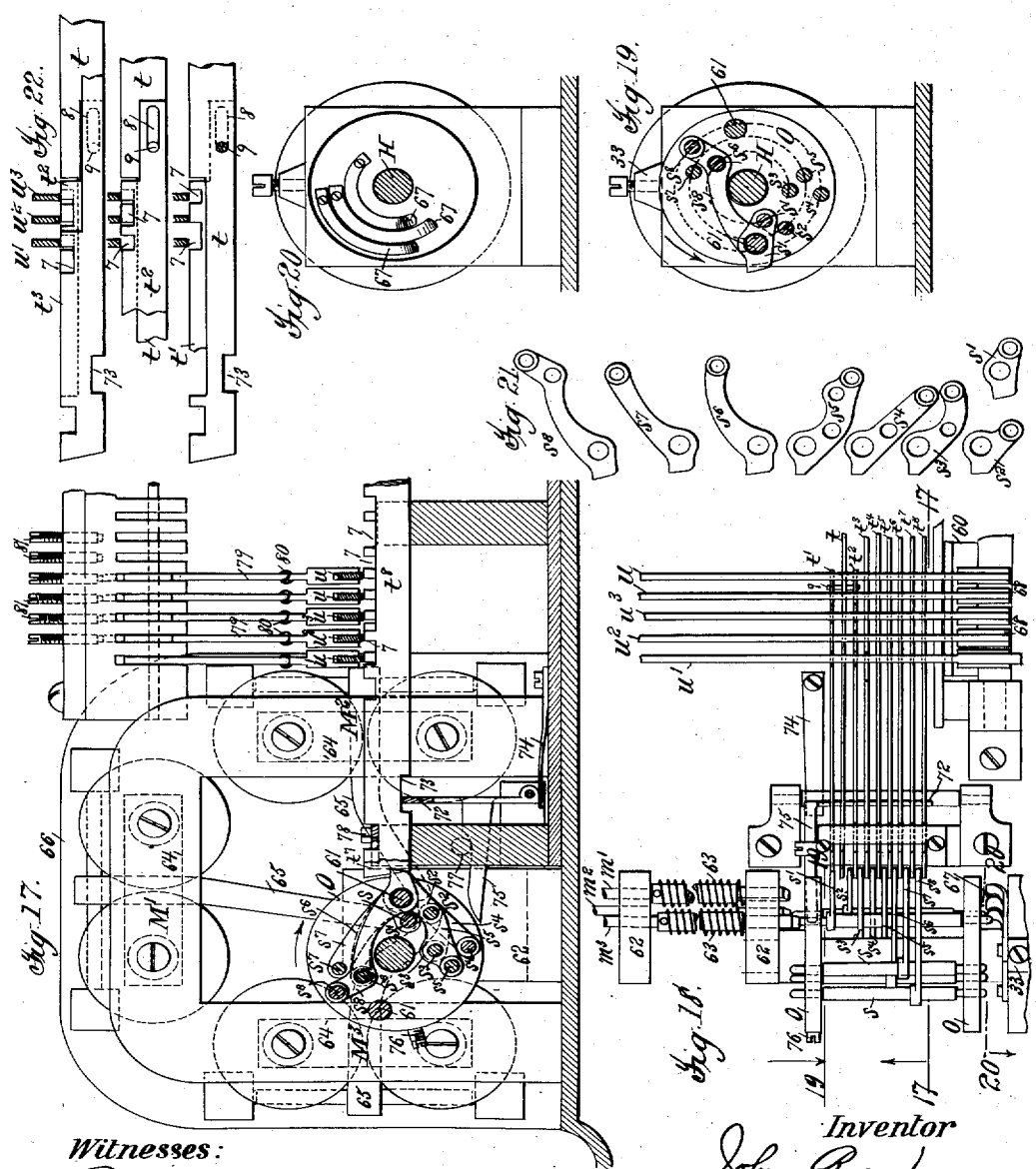

No. 811,127.

PATENTED JAN. 30, 1906.

J. BURRY.
TELEGRAPHY AND TELEGRAPH APPARATUS.
APPLICATION FILED OCT. 7, 1893.

8 SHEETS—SHEET 7.

Attest:
Inventor:
John Burry

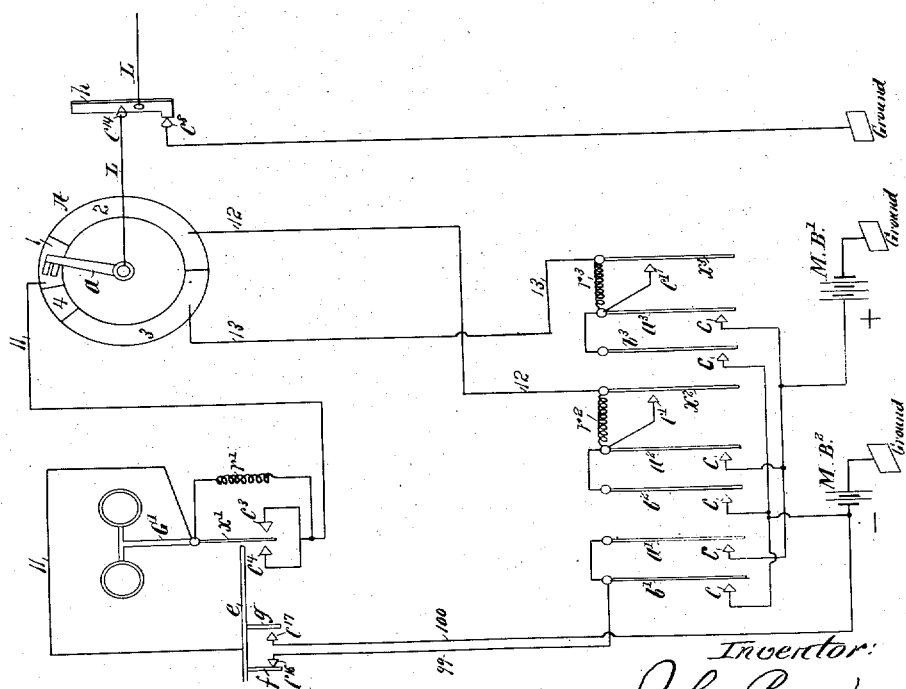

UNITED STATES PATENT OFFICE.

JOHN BURRY, OF NEW YORK, N. Y., ASSIGNOR OF ONE-HALF TO JAMES E. MUNSON, OF NEW YORK, N. Y.

TELEGRAPHY AND TELEGRAPH APPARATUS.

No. 811,127.      Specification of Letters Patent.      Patented Jan. 30, 1906.

Application filed October 7, 1893. Serial No. 487,489.

*To all whom it may concern:*

Be it known that I, JOHN BURRY, a citizen of the United States, residing at New York, county of New York, and State of New York, have invented certain new and useful Improvements in Telegraphy and Telegraph Apparatus, fully described and represented in the following specification and the accompanying drawings, forming a part of the same.

The object of the present invention is to provide an improved telegraph system and apparatus applicable to printing-telegraphs and similar constructions, and especially to provide a system and apparatus by means of which a type-writer or other machine controlled by the selection of one of a number of keys may be operated with certainty and at a high rate of speed.

Further objects of the invention are to provide an improved telegraph system and apparatus by means of which a type-writer or other keyboard-machine forming the transmitter may be used also as a mechanically-operated machine in the usual manner and to combine in a single instrument a transmitter, receiver, and machine capable of mechanical operation.

I attain these objects in accordance with the present invention by the use of mechanism connected to the keys or other operating members of the receiving instrument so as to actuate the key or other member selected and including a plurality of selectors which determine the member to be operated in combination with a magnet or series of magnets which or each of which controls the movement or position of a series of selectors according to electric impulses transmitted to the magnet in different combinations corresponding to the member to be selected, so that a single magnet performs the work of a plurality of magnets in conjunction with the selecting devices.

It is evident that many different arrangements of selecting devices, magnets, and transmitting apparatus for sending the impulses to the magnet or magnets in different combinations may be made embodying the broad invention and that such arrangements are to some extent a matter of judgment and will be varied in accordance with the character of the machine to be operated, the speed desired, and the number of keys or other members from which selection is to be made. As the invention is designed especially for application to a type-writer telegraph and consists in part of constructions in such an apparatus, the invention will be described with especial reference thereto.

In operating a keyboard type-writer of ordinary form it is necessary to transmit combinations for at least eighty different characters, and it will be found that for certainty of action and high capacity with this range of combinations it is preferable to use three impulses, two polarities, and two strengths of current, by the different combinations of which elements the selection may be made in a system employing but a single line-wire and three magnets, two magnets responding, respectively, to impulses of plus or minus polarity and ordinary strength of current, and a third magnet responding to either plus or minus impulses of increased strength.

The selecting mechanism employed may also be varied widely, and its form and arrangement also will depend somewhat upon the number of combinations and the speed required. A simple arrangement and one which will be found efficient in practice has been selected for illustration, in which a series of movable selecting-bars having openings or alternate elevations and depressions arranged as described in the patent to J. E. Munson, No. 246,411, are used, the movement of these bars preferably being a longitudinal sliding movement, the position of these selecting-bars by the correspondence or non-correspondence of their opening or elevations and depressions determining the key or other member to be selected, each combination resulting in the movement of the selecting-bars, so as to select a certain key. The selecting-bars are preferably controlled by the magnets through a series of selectors positioned by the magnets and acting upon the selecting-bars after the positioning operation, this construction enabling a high capacity to be secured by constructing the apparatus so that the positioning operation of the magnets upon the selectors may proceed simultaneously with the selection of the key to be actuated by the selecting-bars and its impression movement. The selectors are preferably mounted on a selector-carrier, so as to be moved past the magnets in order that the selectors may be acted on successively according to the impulses sent to the magnets, and it has been found preferable to use as the carrier a rotating selector-wheel, during the rotation of which the selectors are positioned and the selecting-bars actuated, the selectors being returned to normal position at the end of each rotation of the wheel and the operation of the key selected and return of the selecting-bars to normal position taking place during the first part of the next rotation. It will be understood, however, that this feature of simultaneously selecting and operating the key by different portions of the machine is not absolutely essential. It is preferably used, however, as it enables a high capacity to be secured without decreasing the time allowed for the action of the transmitter and magnets, and thus aids in securing synchronism of movement between the transmitter and receiver.

The transmitter and connections for sending impulses to the selecting-magnets in the proper combinations may be of any suitable form which can readily be varied by those skilled in the art. In the system now being described, however, in which currents of different polarities are used, two sunflowers are preferably employed for distributing the impulses, three segments being used for the three impulses, the impulses through which are controlled from the keyboard by suitable circuit-closing devices, and varying the strength of the current by control of resistances, in accordance with the combination corresponding to the key actuated, and the receiver-circuits are controlled by a polarized relay in the line responding to plus or minus currents of ordinary strength and a relay responding only to currents of increased strength, and impulses are thus transmitted to the three corresponding magnets.

The construction and arrangement of both the transmitter and receiver will vary with the class of machines used. Thus in some machines, such as the Caligraph type-writer and type-setting machines, no shift for upper case and figures is used, while in the Remington and many other type-writers the paper or type is shifted, either one or two shifts being used. In case a shift or shifts are used this may readily be provided for by using one or more shifting-magnets on the receiver local circuit and controlling these shifting magnets by a shifting key at the transmitter, which may be similar to those in common use. In such a system it will probably be found convenient to use the combinations having a first impulse of one strength for the lower-case letters and the same combinations, but commencing with plus and minus impulses of the other strength, for the capitals and the figures, punctuation, &c., so that the shifting key simply changes the resistance when shifted in one direction, and when shifted in the other direction changes the resistance and actuates a pole-changer, so as to change the first impulse to the opposite polarity from that normally used on the first impulse for the lower case. In the system selected for illustration the combinations having a first plus impulse of ordinary strength are used for the lower-case letters and the same combinations with the first impulse of increased strength for the capitals, and with the first impulse of increased strength and opposite polarity for the figures, leaving a series of combinations, commencing with a minus impulse of ordinary strength, for extras—such as the space-key, carriage-return, &c. The carriage of the type-writer may be returned by the receiving operator; but it is preferable to return this automatically, and this result is preferably secured by attaching a returning-cord to the carriage and securing this to a rotating member upon which the cord is wound in returning the carriage and from which it is unwound during the feeding movement in printing a line, this rotating member being controlled by a combination assigned to it and selected and actuated as in the case of the impression-keys.

As above stated, the transmitter and receiver are preferably combined in a single machine and so arranged that the receiving portion of each machine coacts with the transmitting portion of the same machine, and the message sent is thus transmitted electrically also to the receiving portion at the transmitting-station, thus giving a check not only upon the accuracy of the operator in transmitting the message, but also upon the action of the apparatus in transmitting the message. As above stated, also, this machine is also preferably capable of operating mechanically in addition to its use as a part of the telegraphic apparatus.

In the preferred system and construction the transmitter is not in circuit with the receiver in the same machine or at the receiving-station except when the transmitter is operated; but means are provided by which upon the transmitter being actuated it is automatically and mechanically thrown into circuit with both receivers. Thus the transmitter at the receiving-station is not in circuit with the receiver while a message is being received. Any suitable means may be used for securing the use of the machine mechanically without interfering with the connections by which it is used as a transmitter. A simple and convenient method, however, in the case of a type-writer or other keyboard-machine is to use two keyboards, one set of keys operating the machine directly and the other through electrical connections.

The invention includes also various features in the construction and arrangement of the apparatus by which certainty of operation and speed are secured and various combinations of parts which may be used in other systems and apparatus and are claimed broadly, all of which will be fully described herein and specifically pointed out in the claims.

As a full understanding of the invention can best be given by an illustration and detailed description of a system and apparatus embodying the invention, the invention has been thus illustrated in the accompanying drawings, forming a part of this specification, which show the invention embodied in a convenient construction as applied to a typewriter of common form known as the "Williams" type-writer, this type-writer being selected as well adapted for illustrating the various features of the invention.

In the drawings, Figure 1 is a side elevation of the complete transmitter and receiver. Fig. 2 is a vertical section taken through the type-writer and keyboards. Fig. 3 is a horizontal section taken below the type-writer. Fig. 4 is a vertical section on the line 4 of Fig. 3. Fig. 5 is a vertical section on the line 5 of Fig. 4 looking to the left. Fig. 6 is a vertical section taken centrally through the motor-shaft and showing the selector wheel and magnets in elevation. Fig. 7 is a section on the line 7 of Fig. 6. Fig. 8 is a section on the line 8 of Fig. 7. Fig. 9 is a section on the line 9 of Fig. 6. Fig. 10 is a reversed plan of the end of the stopping-lever shown in Fig. 9. Fig. 11 shows the cam for operating the impression mechanism. Fig. 12 is a section on the line 12 of Fig. 6. Fig. 13 is a plan view of the switch shown in Fig. 12. Fig. 14 is a section on the line 14 of Fig. 6. Fig. 15 is a cross-section on the line 15 of Fig. 3. Fig. 16 shows the sunflowers, the section being taken on the line 16 of Fig. 6. Fig. 17 is a section through the selecting devices on the line 17 of Figs. 6 and 18. Fig. 18 is a plan view of the selector-wheel and selecting-bars at one side of the machine. Figs. 19 and 20 are views, respectively, on the lines 19 20 of Fig. 18. Fig. 21 is a detail of the different selectors. Fig. 22 is a detail of a portion of some of the selecting-bars. Fig. 23 is a side view of the transmitter-keyboard on the opposite side from Fig. 1. Fig. 24 is a detail cross-section of a portion of the transmitter-keyboard. Fig. 25 is a detail hereinafter referred to. Fig. 26 is a diagram of the electrical connections. Fig. 27 is a similar diagram showing a modification of the transmitter.

A brief description of the electrical connections will first be given in order that the functions of the different parts of the mechanical construction may be more readily understood in connection with the detailed description thereof, and then the electrical, in connection with the mechanical, features will be fully described in connection with the operation of the apparatus.

The transmitting portion of the machine (shown at the left in the diagram, Fig. 26) consists, essentially, of the two rotating sunflowers A B and corresponding trailers $a$ $b$, each sunflower having three segments 1 2 3, connected, respectively, by pairs of wires 11 12 13 to contact-plates or springs $a'$ $b'$ $a^2$ $b^2$ $a^3$ $b^3$, lettered, respectively, to correspond to the different sunflowers and segments thereof through which they respectively close circuit, these contact-plates being actuated from the keys, so as to make or break contact with contacts $c$, connected with the main battery MB. To provide for the increase in strength, resistances $r'$ $r^2$ $r^3$ are provided for the corresponding segments, the resistances for the second and third segments being controlled by contact-plates $x^2 x^3$, forming shunts and actuated from the keys in the same manner as the other contact-plates, so that for the second and third impulses either one or two plates may be actuated by the keys, according as the impulse is to be weak or strong, these contact-plates $x^2$ $x^3$ making contact when actuated with the contacts $c'$, connected to the other contact-plate for the same segment. The resistance $r'$ for the first segment and impulse is shunted only on the operation of the shift-key, as in the system and machine shown the combinations commencing with impulses of more than normal strength are assigned to the capitals and the figures, and this resistance is thrown out by the shift-key G', which carries a contact-plate $x'$, which makes contact with either of two contacts $c^3$ $c^4$, according as the first impulse is of plus or minus polarity and cuts out the resistance $r'$, a pole-changer $e$ being actuated by the shift-key when shifted for printing figures and engaging contact-plates $f$ $g$, making contact with contacts $c^5$ $c^6$ $c^7$, so as to shift the contacts and change the polarity of the first impulse to minus. The sunflowers A B have also a short segment 4 after segment 3, not in circuit, this segment giving time for the mechanical action of the machine after the last impulse is transmitted, and the segments 1 2 3 are preferably made of increasing length, as usual, to aid in securing synchronism. The sunflower A is provided also with grounds $d$ between segments 1 and 2 and segments 2 and 3, as will be fully described hereinafter. The trailer $a$ is connected to the line-wire L and the trailer $b$ to the wire L', which is connected to ground and serves as a return. The transmitter is normally short-circuited, as the wires L L' are connected by a switch $h$, making contact with a contact $c^8$, connected to wire L'. This switch $h$ is the main switch and is automatically operated by the transmitter to break contact with $c^8$ and throw the transmitter and receiver into circuit. The circuit is controlled also by the contact of switch $h$ with a second contact $c^{14}$, and this contact is automatically opened to break the circuit and prevent repeating. In the receiving portion of the machine the line-wire L connects with the relay R, constructed to be energized only by a current of more than ordinary strength, and from the relay R passes to the polarized relay PR, the armature $i$ of which closes contact with either contact $c^9$ or $c^{10}$, according to the polarity of the current, and is normally central between the two contacts, thus closing the local circuit from local battery LB and wire 14, connected to the armature $i$, through wire 15 and selecting-magnet M' or wire 16 and selecting-magnet $M^2$, according to the polarity, and independently of the polarity through wire 17 and magnet M, which is the magnet by which the machine is started in motion, and the circuit being completed through wire 18 and rotary cut-out C to ground, a shunt $p$ and contact $c^{15}$ being provided for automaticallly throwing out the starting-magnet M after the machine is in operation. If one of the resistances $r'$ $r^2$ $r^3$ be shunted so as to send an impulse of increased strength to line, the relay R will be energized and by its armature $k$ will close contact with contact $c^{11}$ and throw magnet $M^3$ into the local circuit through wire 19. Two shifting-magnets SM SM' are used in the receiver, these magnets being on a short circuit 20, normally broken and closed through either of the magnets, according to the movement of the shift-key and combination formed by contact-pieces $l$ $l'$ closing contact with contacts $c^{12}$ $c^{13}$.

Referring now to the mechanical features of the apparatus, the invention is illustrated as embodied in a machine combining in itself a transmitter and receiver, so that the message transmitted by the transmitting portion of the machine is recorded at the same station by the receiver portion of the machine, and the transmitting operator may check the message by sight as sent. The machine shown, moreover, is adapted for use as an ordinary type-writer, being provided with two keyboards, by the operation of one of which a message is transmitted electrically and recorded upon the type-writer at the transmitting-station and those in circuit therewith at the receiving station or stations and by the operation of the other of which keyboards the type-writer is operated simply as a mechanical type-writer in the ordinary manner. The receiving portion of the machine, however, is in electrical connection with the transmitting portion of a similar machine at another station or stations, so that it operates as a receiving instrument not only for the transmitter at its own station, but also for distant transmitters. As illustrated, there re, a single machine combines a type-writer and transmitter and a receiver operated by the transmitter at its own station or at distant stations, and this machine and its operation will be first described in detail.

In the machine shown, D is a type-writer of a form now in common use and known as the "Williams" type-writer, having type-bars 21, actuated from the keys F, and the paper-carriage E, having the usual spring step-by-step feeding movement and pivoted on shaft 22, so as to be rocked in either direction from its normal position by the shift-key F', through link 23, for printing capitals and figures, and having the usual keyboard formed by finger-pieces on the keys F. As all these parts are of the usual construction, no further description thereof is necessary, the operation being well understood. The objects to be attained in connection with the type-writer D are, first, to provide means by which any one of the keys F may be operated telegraphically from a keyboard-transmitter; second, to provide means by which the platen may be shifted from the transmitter for printing capitals and figures, and, third, preferably to provide means by which the paper-carriage E may be returned from the transmitter at the end of a line and the paper fed for line-spacing, although the carriage may be returned and the paper fed for line-spacing by the receiving operator, if a wholly automatic machine be not desired. The transmitter will first be described and then the selecting devices at the receiver by which the keys are selected and actuated. In the machine shown a second keyboard G is mounted in front of the ordinary keyboard F of the machine; but it may be mounted at the side or in any other convenient position so that either keyboard may be used at will. The keys G of the transmitter are shown as vertically-silding bars returned by coiled springs 24 thereon, the lower ends of the keys engaging cam-arms 25, carried by bars 26, sliding longitudinally of the machine, each of these bars 26 carrying on its under side studs or projections 5, varying in number and position and engaging plates 27, extending transversely across and below the series of bars 26, these plates 27 being carried by small rockshafts 28, mounted in the side frames of the transmitter-keyboard and carrying outside the frame the series of contact-plates $a'$ $b'$ $a^2$ $b^2$ $a^3$ $b^3$, previously described in connection with Fig. 26, the contacts $c$ being shown as pins mounted on the frame in position to coact with the contact-plates. The rock-shafts 28 are held in normal position to close the contacts, as shown in Fig. 26, and returned to normal position when actuated by the coiled springs 29, and the sliding bars 26 are returned by flat springs 30 pressing against their ends. It will be understood, however, that any other suitable construction and arrangement of devices for producing the necessary contacts by the movement of the keys G and for returning the parts to normal position may be employed.

The sunflowers A B, previously described, are mounted concentrically one inside the other about a shaft H, which carries the trailers $a$ $b$, this arrangement being preferred for simplicity of construction, although it will be understood that the sunflowers may be arranged otherwise and may rotate while the trailers are stationary, if preferred, connection between the contacts $c$ and the segments of the sunflowers being made by the wires 11 12 13, previously described, and through the contact-pieces $m$ $n$, the former series of contacts $m$ being mounted on an insulating-block X, which carries the resistances $r'$ $r^2$ $r^3$, previously described, these two series of contact-plates and the removable block X carrying one set and the resistances being used for convenience in breaking the connections without disturbing materially the wiring. In Fig. 3 the block is shown withdrawn from its place in the machine for clearness of illustration. The sunflowers A B are carried by an insulating-block 32, secured to a standard 33, supporting the shaft H.

The trailers $a$ $b$ are mounted upon the shaft I as follows: The trailer $a$ is carried and insulated from the shaft by insulating-block 34 and connected by contact-piece $o$ and wire L to a contact-piece $c^{14}$, which normally closes contact with switch $h$, and through this switch to line by wire L, while the trailer $b$ has a metallic connection with the shaft, and thus through the frame of the machine to ground, a contact-bar $x$ being also in electrical connection with the frame of the machine and carrying contact $c^8$. Thus the shaft, frame of the machine, and bar $x$ form a connection between trailer $b$ and contact $c^8$, which is indicated by the wire L' of the diagram. It will be understood, however, that the trailer may be insulated from the shaft I and connection be made from the trailer by wire to bar $x$ and thence to ground through the frame of the machine or otherwise.

As above stated, the transmitter is normally shunted by the closing of contact between the switch $h$ and the contact $c^8$, this contact being opened so as to close circuit through the receiver on the operation of any key. To secure this result, the switch $h$ is pivoted on the frame of the machine and is provided at its inner end with an insulated portion 35, which is engaged by a lever 36, pivoted at 37 and having its upwardly-extending arm engaged by a pin 39, carried by a bar 40, corresponding to the bars 26, as previously described, and mounted to slide and return in the same manner, this bar, however, being actuated by each key, so that on the depression of any key the switch $h$ is moved from the position shown in Fig. 13 against the tension of spring 31, so as to open the contact $c^8$ and close the circuit through the magnet M and other parts of the receiver, the switch being returned by the spring 31 when the key is released. The operation of the bar 40 by each of the keys is secured by providing each of the plates 27, in addition to the lip by which it engages the projections 5 on the other bars 26, with a short lip 38 at one end, which engages a projection on bar 40. As above stated, this switch $h$ also makes contact with the contact $c^{14}$, which is normally closed and the opening of which breaks the circuit, and the switch $h$ is provided with an arm 41, engaged by a trip 42 on a disk 43, carried by shaft H, so that in case a key be held depressed too long the repetition of the character will be prevented by the breaking of the circuit by trip 42 as the shaft H completes a rotation. The circuit will then be held broken as long as the key is depressed and the switch shifted; but upon the release of the key and the return of the switch to engage contact $c^8$ the switch is thrown off trip 42 and again engages contact $c^{14}$.

The shaft H is actuated and controlled as follows: The main driving-shaft I, shown as a power-shaft driven by the pulley 44, is connected to the shaft H by a friction-clutch of the common cone form, having the two members 45 46, and the shaft H is normally held stationary against the friction of the clutch by a stop-arm 47, carried by the driven clutch member 45 on the shaft H and engaging a stop 48, carried by a lever 49, which is normally held by a spring 50 in position for the engagement of the stop-arm 47 with stop 48 and at its opposite end carries the armature 51 of clutch-magnet M. By this construction when the magnet M is energized by the depression of a key and the transmittal of an impulse through segments 1 of the sunflowers A B, with which the trailers $a$ $b$ are normally in contact, the lever 49 is rocked to raise the stop 48 and release the shaft H, which is then rotated by the clutch 46. On the completion of a rotation of the shaft the stops 47 48 again engage and the shaft is stopped, one rotation of the shaft in the construction shown resulting in the transmittal of a complete combination, the selection of one of the keys F of the type-writer D for the impression movement, and, as will be fully described hereinafter, the operation of the key selected on the previous rotation. A cam-piece 52 is also mounted on the armature-lever 49, this cam-piece engaging the stop-arm 47 and moving the inner member 45 of the clutch slightly longitudinally of the shaft against the coiled spring 53 as the shaft reaches its normal position and holding it in this position while the shaft is stopped, so as to diminish the friction and wear upon the two members of the clutch while the shaft H is stationary. The inner clutch member 45 carries also a pin 54, which engages a spring-arm 55 when the shaft H is in its normal position, and thus presses outward the contact-spring *p* and breaks contact between this spring and contact $c^{15}$, thus throwing the magnet M into circuit. When the shaft H is started and the pin passes out of engagement with arm 55, the contact is again closed and the magnet M cut out of circuit, so that this magnet is energized only on the first impulse and for the purpose of starting the shaft H. The release of the armature 51 for the return of the stop 48 into position to engage the stop-arm 47 and stop the shaft H at the end of a rotation is assured, and the repeated operation of the lever 49 at each impulse is prevented.

The parts thus far described are those which perform the functions of the transmitter; but it will be seen that the shaft H also acts when the machine is operating as a receiver and that the magnet M and the devices by which the shaft H is controlled also form a part of the receiver, as well as of the transmitter. The parts to be now described perform no function in the transmitting operation, but belong solely to the receiving portion of the machine.

The shaft H also carries splined on a sleeve forming part of the inner member 45 of the clutch a rotary cam-disk K, having a closed cam which engages a stud 56 on one arm of a horizontal lever N, pivoted at 57 to a plate 58, adjustably secured to the bed-plate of the machine, so as to be adjustable to secure the exact movement required, this lever N being connected by a link 59 to a bar or plate 60, extending transversely to the machine and pivoted at 161, so as to swing longitudinally of the machine, this bar actuating the selected key F through the connections to be described. By placing the cam-disk K upon the sleeve connected to the inner member of the clutch, this sleeve being splined to slide upon the shaft, and connecting the cam to the bar 60 in such a manner that the pull upon the bar 60 tends to force the cam K and the inner portion 45 of the clutch to which it is connected against the outer portion 46 the pressure upon the clutching-surfaces, and consequently the friction between the two members, increases with the pull upon the bar 60, so that the action of this bar is assured, even under varying degrees of resistance of the keys due to excess of friction or wear, while at the same time the clutching-surfaces will slip in case of any absolute block in the movement of the parts before breakage will occur. The shaft H also carries the rotary cut-out C, which, as shown, consists of a block of metal or other conducting material having electrical connection with shaft H and thence to ground and carrying conducting-pins 6, which engage a contact-piece *q*, this cut-out closing the local circuit only when one of the pins 6 engages the contact-piece *q*, with which connects the wire 18, as shown in Fig. 26. The pins 6 are preferably made adjustable, so as to secure the closing of the circuit at just the time desired and to enable the time of closing to be adjusted to aid in securing synchronism, as fully described hereinafter, and in the construction shown the disk forming the contact C is provided with a series of holes, into any one of which the pins 6 may be inserted.

The devices for selecting the key by the combinations of impulses transmitted will now be described.

The shaft H carries outside the standard 33 a selector-wheel O, which in the form shown consists of two disks secured together by tie-rods 61. Mounted to slide in the selector-wheel so as to be positioned according to the different combinations are a series of selectors, each consisting of a rod, by which the selector is mounted in the disks of selector-wheel O, and an arm on the rod, which forms the operating part of the selector, coacting with the selecting-bars above referred to. In the construction shown eight selectors are used, and for conveninece they are numbered in series $s'\ s^2\ s^3\ s^4\ s^5\ s^6\ s^7\ s^8$. The rods by which the selectors are mounted to slide in the selector-wheel are arranged upon three different circles, the selectors $s'\ s^3\ s^6$ being upon the inner circle, selectors $s^4\ s^8$ upon the outer circle, and selectors $s^2\ s^5\ s^7$ upon the middle circle, and the arms on the selectors are of different forms and lengths according to their position, so as to bring the ends of all the selectors in the same plane outside the wheel and in position to engage the selector-bars upon each rotation of the selector-wheel O. These selectors are actuated during the rotation of the selector-wheel O by controllers $m'\ m^2\ m^3$ and the three magnets $M'\ M^2\ M^3$ corresponding to the three series of selectors on the different circles, these controllers consisting in the form shown of sliding bars, mounted in brackets 62 on the base-plate, pressed by springs 63, so as to be normally withdrawn from the paths of the selectors and carried by the armatures 64 of the magnets $M'\ M^2\ M^3$, which armatures are on arms 65, pivoted on the vertical bracket 66 so as to swing toward and from the selecting-wheel, so that the controllers are carried in one direction by the action of the magnets on the armatures 64 when the magnets are energized and on the release of the armatures are returned by the springs 63. These controllers $m'\ m^2\ m^3$ lie, respectively, opposite the path of movement of the three circles of selectors above described, so that when advanced toward the selector-wheel they will extend into the paths of the latter and have their ends next the selector-wheel O formed with surfaces inclined in the line of movement of the selector-wheel, and the ends of the sliding rods forming part of the selectors project outside the wheel, so as to engage the inclined surfaces of the rods $m'$ $m^2$ $m^3$ when the latter are brought into the paths of the rods, and by the cam action of the inclined surfaces press the selectors toward the opposite side of the wheel, so as to change their position relatively to the other selecting devices and in certain combinations for the selection of the key to be actuated. Upon the vertical bracket 33 on the opposite side of the selector-wheel O from the magnets are stationary cam-plates 67, mounted concentrically, a plate for each series of selectors, so that as the selector-wheel completes its rotation the selectors are returned to their normal position, so as to be again engaged and actuated by the inclined ends of the controllers $m'$ $m^2$ $m^3$ on the next rotation of the selector-wheel. The selector-rods, as will be seen from the drawings, are arranged at the proper points on their respective circles to be actuated in succession by their respective controllers $m'$ $m^2$ $m^3$ according as the latter are advanced into position to engage the successive selector-rods, this depending upon the number of impulses transmitted to the magnets $M'$ $M^2$ $M^3$ from the transmitter through the sunflowers A B. The sections of the controller-wheel carrying the selectors, therefore, correspond to the sections of the sunflowers traversed by the rotating trailers $a$ $b$, and it will be seen that synchronism of movement within certain limits must be maintained between the shafts carrying the trailers at the transmitting-station and the shaft carrying the selector-wheel at the receiving-station in order that the impulse transmitted through the first, second, or third segment of the sunflowers may energize the magnet at the proper time in the movement of the selector-wheel to position the corresponding controllers $m'$ $m^2$ $m^3$ to act upon the proper selector. The eight selectors correspond to and are controlled by the first, second, and third impulses of their respective magnets, except that magnet $M^2$, which controls the outer circle of rods and responds to a minus impulse of ordinary strength, controls but two selectors, which correspond, respectively, to the second and third impulses, this magnet controlling no selector on the first impulse, as will be hereinafter more fully explained.

Arranged opposite the selector-wheel O with their ends in position to be engaged by the selectors on the rotation of the wheel when the position of the selectors is shifted, as above described, by the magnets is a series of selecting-bars sliding transversely to the machine, these bars consisting in the form shown of thin metal plates set edgewise vertically and provided with notches 7 on their upper edges, these notches being arranged differently in the different plates. Nine of these plates are used—eight plates (lettered, respectively, $t'$ $t^2$ $t^3$ $t^4$ $t^5$ $t^6$ $t^7$ $t^8$) corresponding to the respective selectors $s'$ $s^2$ $s^3$ $s^4$ $s^5$ $s^6$ $s^7$ $s^8$, by which they are respectively actuated, and a ninth plate $t$, the function of which will be described hereinafter. Upon these plates rest the front ends of a series of links $u$, provided at their outer ends with shoulders 68, forming hooks engaged by the bar 60 in the lower position of the link, the links being normally held raised, so as not to be engaged by the bar 60 in its movement by the raised portions of the selecting-plates, as shown in Fig. 2. When, however, the selecting-plates are so positioned that the notches in the plates register so as to form a notch extending clear across the series of plates, the link $u$ corresponding to such notch will be allowed to drop into the position shown in Fig. 4, so as to be actuated by the bar 60. The first three links, which to distinguish them will be lettered $u'$ $u^2$ $u^3$, are reserved, respectively, for the carriage-return and the two shifts; but each of the other links corresponds to and actuates one of the keys F, these links being pivoted at their rear ends to bell-crank levers 79, which are spring-pressed to normally hold the link $u$ in their rearmost position by springs 80, the normal position of the bell-cranks 79 being adjustable by stop-screws 81, so that these bell-cranks will be held in proper adjusted position for the required action of the type-bars. The rear end of each of the bell-cranks 79 engages a lever 82, pivoted to a frame 83, suspended by pivoted links 84 at the opposite side of the machine, so as to be adjustable to secure the proper position of the bank of levers 82. Each of these levers 82 is connected by a connecting-rod 71, preferably adjustable, as shown, to one of the levers F, this completing the connection between the bank of links $u$ and the key-levers F.

As above stated and as will be seen from the drawings, the selecting-plates are pushed in one direction or to the right in Figs. 3, 17, and 18 by the selectors $s'$, &c., as the selecting-wheel O rotates, and a continuous notch being thus formed the link drops in and is then actuated by bar 60. As the bar 60 draws the link $u$ outward it raises it at the same time, as will be seen from the drawings, and thus releases the selecting-plates, which are then returned to normal position before the link $u$ returns. To thus return the selecting-plates, a vertical return-bar 72 is used, extending across the series of selecting-plates adjacent to the selecting-wheel and entering a notch 73 in the lower edges of the plates, this bar being pivoted to the base-frame and normally held by spring 74 in the position shown in Fig. 17, in which the selecting-plates are free to be moved longitudinally by the selectors a short distance. The return-bar 72 is provided with an arm 75, which is engaged by a stud 76 on the selector-wheel O, this stud being shown as a screw, so as to be readily adjusted, and the return-bar 72 thus actuated at the proper time and carried toward the selector-wheel, so as to return the selecting-plates to normal position, the movement of the return-bar under the pressure of spring 74 being limited by a stop 77, engaging the arm 75, and the movement of the selecting-plates in both directions is limited by a fixed stop-plate 78, set into a slot in the upper edges of the plates.

As above stated, there are nine selecting-plates, but eight of which are engaged by the selectors. Of these eight selecting-plates engaged by the selectors two (lettered, respectively, $t'$ $t^2$ and corresponding, respectively, to selectors $s'$ $s^2$) are short plates and, as shown clearly in Figs. 18, 22, extend under and control only the two links $u^2$ $u^3$ for the two shifts, these two selecting-plates being actuated, respectively, by the first impulse of the magnets $M'$ $M^3$, which corresponds, respectively, to currents of plus polarity and increased strength, $M^2$ actuating no selecting-bar on the first impulse, as above stated. Each of the selecting-plates $t'$ $t^2$ is provided with a slot 8, through which passes a pin 9, carried by the extra plate $t$, which may be termed the "universal" plate, this plate being actuated by either of the plates $t'$ $t^2$ in its movement. The notches upon this plate $t$ are so arranged that when it is moved, which is upon the formation of every combination commencing with an impulse of plus polarity or an impulse of increased strength of either polarity, it cuts out one series of combinations—namely, that commencing with an impulse of minus polarity and ordinary strength—and throws in all other combinations. When this plate is stationary, therefore, the combinations commencing with a minus impulse of ordinary strength may be formed and therefore it is unnecessary to actuate this plate for such combinations, so that the minus magnet $M^2$ actuates no selecting-plate on the first impulse. Of the other selecting-plates $t^3$ $t^4$ $t^5$ correspond to the second impulse and the corresponding selectors, and plates $t^6$ $t^7$ $t^8$ to the third impulse and corresponding selectors. The action of the plates on the different impulses will be understood from the following table:

| Character of impulse. | + | — | # | = |
|---|---|---|---|---|
| Magnet energized | $M'$ | $M^2$ | $M'$ $M^3$ | $M^2$ $M^3$ |

*Selecting-Plates Actuated.*

| | | | | |
|---|---|---|---|---|
| 1st impulse | $t'$ $t$ | none | $t'$ $t^2$ $t$ | $t^2$ $t$ |
| 2d impulse | $t^3$ | $t^4$ | $t^3$ $t^5$ | $t^4$ $t^5$ |
| 3d impulse | $t^6$ | $t^8$ | $t^6$ $t^7$ | $t^8$ $t^7$ |

The different combinations of impulses produced by the transmitter acting through the magnets to position the selectors thus produce different positions of the selecting-plates, and to each combination corresponds a certain key-lever, and on the arrangement of the selecting-plates in accordance with the combination assigned to said key-lever a continuous notch in the series of selecting-plates is formed opposite the link $u$ connected to said key-lever, into which the link $u$ drops, so that on the movement of the bar 60 the key-lever F thus selected is actuated by the bar engaging the shoulder 68 of the link corresponding thereto.

As above stated, the links $u^2$ $u^3$ are not connected to keys, but are used for shifting the carriage forward or backward for printing capitals or figures when the shifting combinations are formed. The combinations assigned to the capitals are those having a first impulse of plus polarity and increased strength and those for figures of minus polarity and increased strength. These combinations, therefore, all result in moving the selector-plate $t^2$ and the combinations for capitals in moving also the selector-plate $t'$.

From an examination of Figs. 18, 22 it will be seen that the movement of both the short plates $t'$ $t^2$ brings notches in these plates into line opposite the link $u^2$ and that the plate $t'$ has a notch normally opposite the link $u^3$, and the movement of the plate $t^2$ brings a notch in that plate opposite the link $u^3$, so that these two links $u^2$ $u^3$ are controlled by these two plates, the other plates being cut out opposite these links, so that their position has no effect upon them. As the movement of the plate $t^2$ is produced only by a first impulse transmitted to magnet $M^3$—that is, a first impulse of increased strength—it will be seen that the two short plates $t'$ $t^2$ are never positioned so that the links $u^2$ $u^3$ can drop except when combinations commencing with a plus or minus impulse of increased strength are made, the selection of the link $u^2$ $u^3$ depending upon whether the plate $t'$ is actuated, together with plate $t^2$, or not—that is, whether the first impulse is transmitted to the plus magnet $M'$ or to the minus magnet $M^2$—in the former case the plate $t'$ being actuated together with plate $t^2$ and in the latter case the minus magnet $M^2$ actuating no plate on the first impulse, as previously described. It will be understood that the continuous notch for links $u^2$ $u^3$ being formed on the first impulse in accordance with the polarity of said impulse, the combination completed by the second and third impulses, or in the case of one character the shifting of the plate $t$ on the first impulse, the second and third not being employed, results in the formation of another continuous notch for one of the links $u$, connected to a key-lever F, so that for capitals and figures the bar 60 when actuated actuates one of the links $u^2$ $u^3$ for shifting the carriage and also one of the links $u$ for the impression of the desired character.

The links $u^2$ $u^3$ are connected to swinging arms 79, pivoted on the same line as bell-crank levers 79 and returned by springs 80 in the same manner as these bell-crank levers; but the upper arm of the bell-crank is not required, as no type-lever is actuated. The swinging levers 79 are simply supports for the links $u^2$ $u^3$ and means for returning them, the links $u^2$ $u^3$ carrying the contacts $l$ $l'$, as shown in Fig. 4, so that immediately upon the first impulse and the dropping of one of the links $u^2$ $u^3$ the contact is formed between the contact-piece $l$ or $l'$ and the contact-spring $c^{12}$ or $c^{13}$, according to the link, and this contact is maintained during the forward movement and return of the link, thus insuring the proper shifting of the carriage before the impression is made and its being held in proper position during the impression. The contact-pieces $l$ or $l'$, corresponding to the links $u^2$ $u^3$, close contact through wires 20 and local battery LB with shifting-magnets SM or SM', according as the carriage is to be shifted for capitals or figures. These shifting-magnets shift the carriage by means of crank-arms 85 on rock-shaft 22, by which the carriage is pivoted, these crank-arms 85 carrying the armatures 86 of the magnets and the levers being so arranged, as shown clearly in Figs. 4 and 5, as to shift the carriage in opposite directions.

The shift-key G' on the transmitter is mounted on the side of the keyboard in the same position as on the type-writing machine and by its movement for capitals simply closes contact between contact-piece $x'$ and contact $c^3$ and cuts out the resistance $r'$ as long as it is held down, while by its movement in the opposite direction for printing figures it closes contact between contact-piece $x'$ and contact $c^4$, so as to cut out the resistance $r'$, and by means of the pole-changer $e$, which consists, in the form shown, of a bar of insulating material mounted to slide in brackets on the keyboard-frame and having two arms engaging the contact-pieces $f$ $g$, shifts the contact-spring $f$ from contact $c^5$ to contact $c^6$ and contact-spring $g$ from contact $c^6$ to contact $c^7$, so as to make the first impulse of minus polarity. The shift-key G' is returned to position by springs 83 of common form, embracing a crank-arm on the shift-key.

The carriage may be returned at the end of the line by the receiving operator; but it is preferable that the machine be made entirely automatic, and for this purpose there is shown means for automatically returning the carriage controlled from the transmitter, the link $u'$ being used for this purpose and a certain combination assigned to it, for which may be used any of the combinations commencing with the minus impulse of ordinary strength, the two short selecting-plates $t'$ $t^2$ being provided with notches which in the normal position of these plates register with the link $u'$, so that a notch may be formed for this link without actuating either of these plates, this link being selected, therefore, by the combination of second and third impulses with a first minus impulse of ordinary strength. The principle used in the carriage-return is that of a rotating member by which is wound up for the return of the carriage a cord connected to the latter, this cord being unwound from the rotating member during the feeding movement. The following is the construction shown: Upon the constantly-rotating shaft I, from which the shaft H is actuated, as previously described, is splined a disk 87, which forms one member of a clutch, the other member 88, being normally pressed away from it by a spring 89 and carrying a sleeve 90, upon which the cord connected to the carriage is wound, this cord $v$ being connected to the carriage at one end, running over pulleys 91, and at its opposite end to the sleeve 90 through eye 92. The clutch member 87 is thrown into clutching contact with the other clutch member 88 for the return of the carriage by a cam $w$, carried by a lever 93, pivoted on the frame and engaged by a sliding throw-off 94, which carries the eye 92 and is provided with a notch 95 on one side, entered by the lever 93, so as to actuate the latter in both directions, this throw-off 94 being guided by a slot-and-screw connection to the frame and throw-off. This throw-off 94 has a slot connection providing for lost motion, with a link 96 connected to one arm of a bell-crank lever 97, pivoted on the base-plate of the frame and having its other arm connected by a link 98 to the link $u'$, and the cord $v$ carries a trip $y$, which may be a knot or any suitable projection to catch in the eye 92, preferably a collar adjustable on the cord, as shown. By this construction when the carriage is to be returned the actuation of the key on the transmitter producing the combination assigned to the link $u'$ this link is actuated, thereby shifting the throw-off 94 through link 96, lever 97, and link 98, so as to throw the lever 93 inward from the position shown in Figs. 7 and 8, so that the cam $w$, acting on the rim of the sleeve 90, forces the clutch member 88 into contact with member 87 and holds it there, so that sleeve 90 is rotated by the shaft I and the cord $v$ wound up for the return of the carriage. The link $u'$ and lever 97 are returned almost immediately, this being permitted without movement of the throw-off 94 and lever 93 by the lost-motion connection $z$, and the throw-off is shifted to throw the lever outward and release the clutch when the carriage is fully returned by the engagement of the stop $y$ with the eye 92.

The operation of the apparatus will now be described. The machine shown, as above explained, forms the complete apparatus at each station embodying in one the transmitting and receiving instruments, it being understood that a similar machine is located at each one of the stations, the two shafts H of the machines at the transmitting and receiving stations rotating in unison, so that the trailers $a$ $b$ of the machine at the transmitting-station and the selecting-wheel O of the machine at the receiving-station move in synchronism within the limits of the segments of the two wheels, in order that the selector-rods controlled by the different magnets may be shifted into position to engage the selecting-bars or left in normal position, so as not to engage them, according as an impulse is transmitted through the segments of the sunflowers corresponding to the segments of the selector-wheel in which the selector-rods are placed.

The operation of the apparatus will first be described in detail, assuming that complete machines are placed at both the transmitting and receiving stations, and then a brief description given of the construction and arrangement in case separate transmitting and receiving instruments are used. It will be understood that the simplest combinations will be applied to the letters most frequently used; but it is thought unnecessary to explain in detail the arrangement of combinations, as this is within the judgment of one skilled in the art. Assuming for the purpose of illustration, however, that the character to be printed is the letter "b," lower case, and that the combination assigned to this letter is + − ╫—that is, a first impulse of plus polarity and ordinary strength, a second impulse of minus polarity and ordinary strength, and a third impulse of plus polarity and increased strength—the operation is as follows: The circuits will be traced by reference to the diagram, Fig. 26, it being understood that the wires shown therein represent any suitable connection, and the term "wire" is thus used. The key G of the machine at the transmitting-station being depressed by its action on cam-piece 25 on the bar 26, corresponding to said key, slides the bar rearward, and by its arrangement of projections 5, acting on the plates 27, carried by rock-shafts 28, which carry the contact-pieces, rocks the shafts required to shift the contact-pieces $a'$, $b^2$, and $a^3$ from the contacts $c$, with which they make contact, as shown in Fig. 26, to the contacts connected with the other wire of the battery MB and to shift the outside contact-piece $x^3$ into contact with the contact-piece $c'$, thus shunting the resistance $r^3$. The movement of the key also through lip 38 actuates bar 40, carrying pin 39, and this pin engages the upper arm on the lever 36 and carries the lower arm into position to shift the switch $h$, so as to break contact with the contact $c^8$, thus breaking the shunt-circuit in which the transmitter is placed normally and throwing the transmitter on to line, as will be clear from the diagram, Fig. 26. The trailers $a$ $b$ are now in contact with the first segments of the sunflowers A B, and an impulse is now transmitted through contact-piece $a'$, wire 11, resistance $r'$, contact-piece $f$, and contact $c^5$ to the segment 1 of sunflower A, trailer $a$ in contact therewith, and line L to the receiving portion of the machines at the transmitting and receiving stations, and back through ground line L', trailer $b$, segment 1 of sunflower B, wire 11, contact $c^6$, and contact-piece $g$ to contact-piece $b'$ and contact $c$, and thus to battery. This impulse energizes the polarized relays PR at the transmitting and receiving stations, so as to close contact between contact-piece $i$ and contact $c^9$, so that the local circuits from local batteries LB are completed through wire 14, contact-piece $i$, contact $c^9$, wire 15, magnet M', wire 17, magnet M, wire 18, contact $q$, cut-out C, and ground, it being understood that the circuit is broken at C except when one of the pins 6, carried by the rotating disk of the cut-out, is in position to make contact with contact-piece $q$. In the normal position of the parts, however, this contact is closed, as is necessary to start the machine. As the magnets M are thus energized, the first result produced by this impulse in each machine is to rock the lever 49 by the attraction of the armature 51, and thus raise the stop 48 out of the path of arm 47, carried by the inner clutch member 45 of shaft H, the friction of the clutch then rotating shafts H of the transmitting and receiving instruments with their respective shafts I. The two shafts are thus started in motion at the same time. The magnet M' in each machine being energized by this impulse, the movement of its armature 65 advances the controller $m'$ against the tension of spring 63 into the path of selectors $s$, and as the selector-wheel O, carrying the selectors $s'$, &c., passes the controller $m'$ the selector $s'$ is moved into a plane opposite the selector-plate $t'$, so that on the completion of the rotation of the selector-wheel this selector will engage and move the selector-plate $t'$, thus completing at each station the movement of the first impulse of the combination. As the rotation of the shaft H at the transmitting-station continues the trailers $a$ $b$ are carried from the first segment of the sunflowers A B onto the second segment, and the circuit through segments 1 is thus broken and magnets M M' deënergized the controllers $m'$ being then returned by their springs 63. As the magnets M are deënergized the armatures 51 are released and the levers 49 are rocked by the springs 50, so as to carry the stops 48 and cams 52 into position to engage the stop-arms 47 when the shafts H have completed a rotation, and thus stop them and hold them in normal position until the magnets M are again energized by the depression of another key. The magnets M are not energized on the second and third impulses, but are shunted, except when the parts are in the normal position, the shafts H at the commencement of their rotation moving the pins 54 out of engagement with the arms 55, so as to release the spring-contact $p$ and allow it to return and close contact with contact $c^{15}$, as will be clear from Fig. 9. It will be seen also that the local circuit is broken by the rotation of the shaft H, carrying one of its pins 6 out of contact with the contact-piece $q$ before the line-circuit is broken, so as to break contact at contact-piece $i$, and likewise upon sending the next impulse the contact is first closed between the contact-piece $i$ and contact $c^9$ or $c^{10}$ and then the next pin 6 brought in contact with the contact-piece $q$, so that the local circuit is never completed or broken at the contacts $c^9$ $c^{10}$ except upon sending the first impulse. The purpose of this construction will be fully explained hereinafter. As the trailers $a$ $b$ come into contact with the segments 2 of the sunflowers A B a second impulse of minus polarity is transmitted through the contact $c$, contact-piece $b^2$, resistance $r^2$, wire 12, segment 2 of sunflower B, trailer $b$, wire L′, and ground, returning through the receiver, wire L to trailer $a$, segment 2 of sunflower A, wire 12, contact-piece $a^2$, and contact $c$ to left of $a^2$ to battery. By this impulse the polarized relay PR at each station is energized, so as to close contact between contact-piece $i$ and contact $c^{10}$, and the circuit through local battery LB is thus closed through wire 14, contact-piece $i$, contact $c^{10}$, wire 16, magnet $M^2$, wire 17, contact-piece $p$, and contact $c^{15}$, and cut-out C to ground, when the cut-out C has reached the proper position, thus energizing magnet $M^2$. The magnet $M^2$ of each machine when energized on this second impulse advances controller $m^2$ by its armature-lever 65 against the tension of spring 63 into the path of the selector $s^4$, corresponding to selector-plate $t^4$, so that as the selector-wheel continues its rotation and the selector-rod is carried past the beveled end of the controller this selector is moved into position to engage and actuate the selector-plate $t^4$. The circuit through magnet $M^2$ is now broken by cut-out C and the controller $m^2$ returned by spring 63, and the trailers $a$ $b$ of the transmitter being now carried by the rotation of the shaft H off the second segments of the sunflowers A B the line-circuit is again broken. When the trailers are on their third segments, an impulse of plus polarity of increased strength is transmitted from battery MB, through contact $c$ at right of $a$, contact-piece $a^3$, segment 3 of sunflower A, trailer $a$, wire L and the receiving portion of the machines returning through ground, wire L′, trailer $b$, segment 3 of sunflower B, wire 13, contacts $x^3$ $c'$ $b^3$, and contact $c$ to left of $b^3$ to battery, the resistance $r^3$ being shunted by the movement of the contact-piece $x^3$, as previously described. By this impulse of increased strength the polarized relay PR at each station is actuated so as to close contact between contact-piece $i$ and contact $c^9$ and close the circuit through local battery LB, as previously described in connection with the first impulse, except that contact is first closed at contact $c^9$ and then the circuit completed by cut-out C, and the relay R is also energized at the same time as relay PR, so as to close contact between the contact-piece $k$ and contact $c^{11}$, thus throwing magnet $M^3$ into circuit by wire 19, magnets M′ and $M^3$ thus being energized. The two magnets M′ $M^3$ at both stations when thus energized on the third impulse advance their respective controllers $m'$ $m^3$ by their armature-levers 65, against the tension of the springs 63, into the paths of the rods forming part of the selectors $s^6$ $s^7$, corresponding to the selecting-plates $t^6$ $t^7$, so that as the selector-wheel continues its rotation and the rods are carried past the beveled ends of the controllers $m'$ $m^3$ these selectors are moved into position to engage and actuate the plates, the local and line circuits being then broken and selectors returned, as described in connection with the second impulse. As the result of these three impulses, therefore, the selectors $s'$ $s^4$ $s^6$ $s^7$ have been moved into position to move the selecting-plates when the rotation of the selecting-wheels O brings these selectors into position to engage the ends of the plates. On the continued rotation of the selector-wheel O and just before the completion of its rotation this action takes place, the selecting-plate $t'$ carrying the selector-plate $t$ with it, and thus selecting plates $t't$ $t^4$ $t^6$ $t^7$ are moved longitudinally to the right in Figs. 3 and 18, this movement of the selecting-plates resulting in the formation of a notch extending clear across the plates under the link $u$, attached to the key F of the type-writer D, which prints the letter "$b$," lower case, this action taking place in the machine at both stations. The machines may be so constructed that the link selected is actuated for the impression movement during this same rotation of the shaft as that by which it is selected, the shaft H having a sufficient movement after the selecting-plates are positioned to secure this result; but it is preferable, especially for a high capacity, to produce the impression during the formation of the combination for the next impression, so that the selection of the key and the operation of the impression devices proceeds simultaneously and a more rapid rotation of the shaft can be secured or a larger range allowed within which synchronism must be secured. The selecting-plates therefore are left in the position resulting from the operation just described until the next rotation of the shafts H on the commencement of the transmittal of impulses for the combinations required for printing another letter. At the end of the rotation the arm 47 on each machine engages the stop 48 and stops the shaft H, the inner member 45 being first thrown away from the outer member 46 by the engagement of the arm 47 with the cam 52, so as to reduce the friction. As the clutch member 45 reaches its normal position and the shaft H is stopped the pin 54 engages the spring 55 and again opens contact between spring $p$ and contact $c^{15}$, so as to open the shunt-circuit, cutting out magnet M. This brings the shafts H on the transmitting and receiving instruments to rest, and thus all parts of the machine are in unison at the end of each rotation, the parts remaining in this position, as shown in Fig. 9, until the magnets M are again energized by the actuation of another key. The selection of the key for the character to be printed has now been made and the link $u$, corresponding to that key, is now in position to be actuated, this being the normal position of the parts. Another key being depressed for the impression of another letter, the formation of a space, or other action of the machine, the magnet M at each station is again energized, so as to rock the stop-lever 49 against the tension of spring 50, remove the stop 48 from the path of arm 47 on the inner member 45, and the shafts H are again rotated with the shafts I. On the rotation of the shaft H the cam K thereon engaging the bowl 56 of lever N rocks this lever toward the front of the machine in Fig. 3 and through the link 59 rocks the bar 60 to the right from the position shown in Figs. 2 and 4, thus drawing forward with it the link $u$, which has dropped into the notch in the selecting-plates provided by the combination, as previously described, and thus through bell-crank lever 79, lever 82, and connecting-rod 71 draws down the lever F, corresponding to the link $u$, and actuates the corresponding type-bar 21 to print the letter "b," this lever also producing the letter-spacing, as in the ordinary type-writer. From an examination of Fig. 4 it will be seen that the bar 60 as it is rocked to the right not only draws the link $u$ outward with it, but also raises the link, and this lifting of the link is sufficient to carry it above the edges of the notches in the selecting-plates into which it is dropped, so as to release the selecting-plates and permit them to be returned, which return is at once secured before the return of the bar 60 by stud 76 on the selector rocking the return-bar 72 to the left in Fig. 17 against the tension of spring 74, this bar after returning the plates being returned to position by the spring. The character having been printed at both the transmitting and receiving stations and the selecting-plates having been returned to position, the bar 60 is returned to the left into the normal position, as shown in Fig. 2, by the cam K acting through lever N and link 59, and these parts are then in position for the impression of another character on the next rotation of the shaft, the operation of positioning the selectors and selecting-plates for the next character having proceeded simultaneously with the impression operation, and thus the operation of the apparatus is repeated for the successive characters to be printed. When the carriage is to be shifted for the impression of capitals or figures, the shift-key G' is moved so as to shunt the resistance $r'$ by the contact-plate $x'$, making contact with one of the contacts $c^3$ $c^4$, according as the shift is for capitals or figures. In the latter case, also, the key G' at the same time shifts the pole-changer $e$, so as to change the contacts made by contact-plates $f g$ and make the first impulse of minus polarity whether the contact-piece $a'$ or $b'$ be shifted by key to close contact. The circuits in both shafts will be understood from the description already given, and the only difference in operation from the same combinations for lower-case letters is that upon the first impulse magnet $M^3$ is always energized in addition to magnet M' or $M^2$, thereby positioning the selector $s^2$ to move the selecting-plate $t^2$. As will be seen from Fig. 22, therefore, the selecting-plate $t^2$ being moved link $u^2$ or $u^3$ will be selected and allowed to drop as a result of the first impulse, these two links corresponding, respectively, to capitals and figures and the selection between the two links being determined by the polarity of the impulse. If a plus impulse, magnet M' will be energized and selector $s'$ and selecting-plate $t'$ actuated so as to move the latter plate with the selecting-plate $t^2$, thus selecting link $u^2$, while if the first impulse be of minus polarity plate $t'$ will not be moved, but only selecting-plate $t^2$ and link $u^3$ selected. By thus selecting link $u^2$ or $u^3$ on the first impulse and one of the links $u$ on the completion of the combination or on the first impulse by the movement of plate $t$ the bar 60 when actuated draws out not only one of the links $u$, but also link $u^2$ or $u^3$. As the link $u^2$ or $u^3$ drops the contact is closed between contact-spring $l$ or $l'$ and contact $c^{12}$ or $c^{13}$, thus throwing shifting-magnet SM or SM' into local circuit on wire 20, the energizing of one or the other of these magnets resulting in the shifting of the carriage through armature 86, lever 85, and shaft 22, as previously described. So long as the shifting key G' is held shifted in either direction at the transmitting-station so long will the resistance $r'$ be thrown out on the first impulse and the contacts be changed, as above described, so as to result in the selection by the first impulse of one of the links $u^2$ or $u^3$ and the shifting of the carriage in one direction or the other. Thus by assigning the same combination to the same letters in capitals and lower case one key serves for both, the shifting key simply increasing the strength of the first impulse so as to energize magnet $M^3$ in addition to magnet M' or $M^2$, with the result as above stated. By the selection and depression of the successive key-levers F of the receiver, as above described, the message is printed as in the ordinary type-writer, the depression of each key-lever resulting also in the movement of the carriage for letter-spacing, and the word-spacing being secured by a space-key, as in the ordinary type-writer, a certain combination being assigned to this, which may conveniently be one of the extra combinations commencing with a minus impulse of ordinary strength. When a line has been printed and the carriage is to be returned for printing another line, which result, as above stated, is secured automatically in the apparatus shown, the depression of the key assigned to the carriage-return produces this combination. Assuming that the combination assigned to the carriage-return commences with a minus impulse of ordinary strength, on the depression of this key the contact-piece $b'$ is shifted from one of its contacts $c$ to the other and a minus impulse transmitted in the same manner as the first impulse above described. The first minus impulse does not result in the movement of any of the selectors or any of the selecting-plates, as the magnet $M^2$ does not actuate any selector on the first impulse. The short selecting-plates $t'$ $t^2$ and the long plate $t$ therefore remain in position for this combination, so that the link $u'$ for the carriage-return is opposite notches in both selecting-plates $t'$ $t^2$ and is free to drop in on the positioning of the other plates by the rest of the combination to permit this. On the completion of the combination by the second or the second and third impulses the link $u'$ drops in and the plate 60 draws out the link $u'$, which is connected by the link 98 to the lever 97. By this movement the throw-off 94 is moved to the right in Figs. 3, 7, and 8, and the throw-off carries the shift-lever 93 inward from the position shown in Figs. 7 and 8, so that the cam $w$ as it moves past the rim on sleeve 90 presses the sleeve and clutch member 88 to the right in Fig. 6, so that the friction between the two clutch members rotates clutch member 88 and sleeve 90 with the shaft I. As the end of the cord $v$ is connected to the sleeve 90 this rotation winds up the cord $v$ and draws the carriage back to normal position. The link returns to position at once, but the throw-off and lever 93 remain in shifted position until the stop $y$ catches in the eye 92 and returns them to normal position, the lever 93 being thrown outward again into the position shown in Figs. 7 and 8, when the clutch 87 88 is released and the two clutch members thrown out of operative engagement by spring 89.

The line-feed of the paper may be secured by a key forming a certain combination assigned to the line-feed; but it is preferable that an automatic line-feed of any of the forms common in type-writers should be provided, so that as the carriage returns to position the paper is automatically advanced a line-space.

It is desirable that some means be provided by which the repetition of the same letter shall be prevented in case the key be held down too long, as it will be seen that during the time that the key is held down the contact-piece $h$ is held by the arm 36, so as to break contact between contact-piece $h$ and contact $c^8$ and throw the transmitter on to line. This is prevented, however, and the line opened through wires L L' on the completion of the rotation of the shaft, even though the key be held depressed. This result is attained by the double contact of switch $h$, the line-wire L from the trailer $a$ being connected to contact-piece $c^{14}$ beneath the switch $h$. The shaft H carries also insulated therefrom a disk 43, and as the shaft reaches the end of its rotation the trip 42 engages a projection 41 on the switch $h$, which is made of a spring-plate and raises the switch, so as to break contact between it and contact $c^{14}$, thus breaking the line-circuit, and the spring is thus held raised and out of contact with contact $c^{14}$, and the line-circuit thus broken until the key is released and the switch $h$ thrown into the position shown in Fig. 3, releasing the projection 41 from the trip 42 when contact is again closed between the switch $h$ and contact $c^{14}$, the transmitter being then shunted by contact $c^8$.

The action of the cut-out C will now be described. It is possible that the circuit be made and broken at contacts $c^9$ $c^{10}$, as the contact-piece $i$ is moved in opposite directions by the polarized relay PR, in accordance with the polarity of the impulse transmitted; but it is preferable to use another contact which does not close the circuit until after contact at $c^9$ or $c^{10}$ is closed, thus avoiding all sparking at these delicate contacts. For this purpose there is preferably used the rotating cut-out C, carrying three pins, these pins corresponding to the three segments of the sunflowers and three impulses to be transmitted. These pins are constructed and positioned so as to close the contact momentarily just at the time when the selector-wheel O is coming into position for the actuation of the selectors by the controller $m'$, $m^2$, or $m^3$, the circuit being closed just long enough to energize the magnets for the actuation of the controllers at the proper time to engage the corresponding selectors, the circuit being broken at the cut-out at all other times, except in the normal position, when this contact must be closed to secure the starting of the shaft H. This feature of making and breaking the circuit by a cut-out so that no sparking can occur at the delicate contacts of the relay is an important feature of the preferred construction and in itself forms a part of the invention. By the use of this cut-out a much heavier local battery can be used than would otherwise be possible, so that the magnets $M'$ $M^2$ $M^3$ will be energized instantly upon the closing of the circuit, which would not be possible with the light battery which should be used if this cut-out be omitted. The result is that the limit of movement between the shafts of the transmitter and receiver within which synchronism must be secured is enlarged as the time consumed by the operation is reduced, and by this immediate action of the magnets synchronism is secured even though the trailers $a$ $b$ and the selector-wheel are nearly at the opposite ends of the corresponding segments of their movement. Moreover, by this cut-out the circuit may be closed in some cases when the two shafts are not in synchronism within the corresponding segments without misprinting, for it is necessary for the selection that this cut-out shall close the circuit at the time when the trailers are in such position as to transmit an impulse and the selector-wheel is in such position as to secure the engagement of a selector-rod by the controller when thus actuated, and this actuation of the controller is, as above stated, only momentary and the controller returns immediately upon the magnet being deënergized. The trailers $a$ $b$, therefore, may be so far out of synchronism with the selector-wheel as to carry the impulse over from segment 2 of the sunflowers into segment 3 of the selector-wheel: but unless the circuit is closed by the cut-out C, so as to energize one of the magnets during the time that this impulse is transmitted and while the selector-wheel is in such position that the controller on being actuated will engage one of the selector-rods, no interference with the operation of the machine will result, the combination having been made while the trailers were on the proper segment 2. It is obviously desirable that the pins 6 in the cut-out C should be positioned accurately, and for this purpose the cut-out is provided with a series of holes set as closely together as possible, and the pins 6 may thus be adjusted to any position desired and positioned properly relatively to the selector-wheel and sunflowers. The segments of the sunflowers, as shown, are divided up so as to provide a comparatively short segment for the first impulse, a longer segment for the second impulse, and a still longer segment for the third impulse, the transmitter and receiver shafts being brought to synchronism at the end of each rotation. This construction provides for an increase of range within which synchronism must be secured, as the tendency to get out of synchronism increases—that is, during the latter part of the rotation of the shafts. Each of the sunflowers has a space 4 between segment 3 and segment 1, which may be connected to ground, if desired, or the circuit otherwise broken while the trailers are thereon, this space providing for a certain amount of movement of the selector-wheel after the impulses have been transmitted to the magnets M' M² M³, during which part of the rotation the selecting-plates are positioned by the selectors. The outer sunflower A is also provided between each of the segments with a ground $d$. This is desirable, especially for long lines, as otherwise the current may be retained in the line during the passage of the trailers from one segment to the other. By the use of this ground, however, the line is discharged quickly and fully between each pair of segments.

It will be obvious to those skilled in the art that the mechanical construction and the electrical devices shown may be varied widely, it being possible to secure the required number of combinations for type-writing and similar purposes in many different ways, and the construction employed will be varied in accordance with the work to be done and the capacity desired. The arrangement shown, however, has been selected as furnishing the required number of combinations and employing but three impulses, so that a very high capacity may be secured without too high a speed of the shafts carrying the trailers and selector-wheels and at the same time providing segments of such length as to give the required range for assuring synchronism of action between the transmitter and receiver. It is obvious, however, that by increasing the number of impulses the number of combinations may be increased or by thus increasing the impulses either the use of two polarities or two strengths may be avoided; but of course the capacity of the apparatus will be correspondingly diminished. Moreover, the apparatus may be constructed so as to avoid the use of polarities by increasing the number of strengths of current or to avoid the use of different strengths by increasing the number of impulses. It is preferable, however, to use the two polarities, as absolute certainty of action is thus secured so far as these elements are concerned, which is difficult, if not impossible, with many different strengths of current. By the use of three impulses, therefore, a high capacity is assured, two polarities and two strengths giving the requisite number of combinations for the purpose of the machine shown, and the polarities giving certainty of action so far as this element is concerned, leaving only two strengths of current to be provided for, so that the difference between these strengths may be such as to secure practical certainty in their action.

In the construction thus far shown two sunflowers have been used with a single battery for the purpose of securing the change in polarity. This is not necessary, however, but, if desired, two batteries may be used with a single sunflower.

In Fig. 27 a diagram of the transmitting part of the machine thus arranged is shown, the receiver being omitted, as it is identical with the diagram, Fig. 26. In this construction only the sunflower A and trailer $a$ are used, the trailer being connected to line and the segments to the different contact-pieces of the keyboard $a'$ $b'$ $a^2$ $b^2$ $a^3$ $b^3$, the shifting-key G' having contact-piece $x'$ for shunting resistance $r'$ on the first segment, and contact-pieces $x^2$ $x^3$, actuated by the keys G for shunting the resistances $r^2$ $r^3$, being used, as in the construction previously described. Two batteries MB' MB² are used, respectively, corresponding to plus and minus impulses, both batteries being grounded on one side. The battery MB' is connected to the contacts $c$, which engage with the contact-pieces $a^2$, and the battery MB² with contacts $c$, which engage with contact-pieces $b^2$, a system of battery connections thus being provided for plus and minus impulses. The arrangement of the shifting-key G' and contacts $c^3$ $c^4$ and the resistance $r'$ is the same as in the construction previously described; but the pole-changer $e$ carries the two contact-pieces $f$ $g$, the contact-piece $f$ being normally in contact with contact $c^{16}$, which connects by wire 99 with contact-pieces $a'$ $b'$, and when the pole-changer is shifted this contact is broken and contact-piece $g$ engages contact $c^{17}$, which through wire 100 connects with the minus battery MB². In this construction there is no return from contact-piece $h$ to the sunflower, but contact $c^8$ is grounded, and the transmitter thus normally shunted, substantially as before. The action of the keys, contact-pieces, and the resistances in transmitting the combinations of impulses through the sunflower to the receiver from either battery, returning through ground, will be understood from the diagram without further description; but the action of the shifting-key G' may be explained. As shown in the diagram, the movement of either contact-piece $a'$ or $b'$ into contact with its contact $c$ transmits an impulse from the corresponding battery MB' or MB² to the first segment of the sunflower A, through wire 99, contact $c^{16}$, contact-piece $f$, pole-changer $e$, which is made of conducting material, wire 11, and resistance $r'$. When the key G' is shifted for capitals by pressure on the left-hand finger-piece in the diagram, so as to carry the contact-piece $x'$ to the right and into contact with contact $c^3$, the action is the same except that the resistance $r'$ is shunted, thus making a first impulse of double strength. When the key G' is shifted for printing figures by pressing on the right-hand finger-piece in the diagram, so as to carry the contact-piece $x'$ to the left in the diagram, the contact-piece $x'$ closes contact with the contact $c^4$ and at the same time shifts the pole-changer $e$ so as to break contact between contact-piece $f$ and wire 99 and close contact between contact-piece $g$ and wire 100 at contact $c^{17}$. By this movement an impulse is transmitted from minus battery MB² through wire 100 and contact-piece $g$, pole-changer $e$, wire 11, contact-piece $x'$, and contact $c^4$ to the first segment, when the switch $h$ is moved by the depression of a key to throw the transmitter onto line, the resistance $r'$ being shunted as before, so that this first impulse is of double strength and minus polarity. If the two polarities are not used, it will be seen that the transmitter will be simplified, as it will be necessary only to use for each segment of the sunflower contact-pieces corresponding in number to the number of resistances employed, the receiver in this case being provided, of course, with a magnet responding to an impulse of ordinary strength and a magnet for each of the other strengths, these magnets operating through controllers upon the selector-wheel O, as in the construction described. As it is within the ability of a skilled electrician to provide this and other electrical arrangements for producing the combinations of the selectors desired, it is not thought necessary to illustrate them herein.

While it is preferable to combine in a single instrument the transmitter and receiver as above described, and this combined machine forms in itself a part of the present invention, it will be understood that the transmitting and receiving apparatus may be separate from each other and that if it is not desired to operate the type-writer mechanically no keyboard need be used thereon, but the machine be operated only by the electrical connections and selecting devices. From the description given above and the diagram, Fig. 26, the changes to be made in case independent transmitting and receiving apparatus are used will be readily understood from a brief statement. The portion of the diagram at the left of Fig. 26 shows the transmitter complete except that there is no means separate from the receiver for controlling the shaft by which the trailers are carried; but as the shaft H carries both the trailers and the selecting-wheel this shaft and the magnet M and other devices for controlling the movement of the shaft perform functions in the machine both as a transmitter and receiver. For an independent transmitter, therefore, it is necessary to add to that part of the apparatus shown at the left of the diagram in Fig. 26 a clutch-magnet similar to magnet M for controlling the action of the shaft H at the transmitter and the contact-piece $p$ and contact $c^{15}$ for cutting out the magnet when the shaft is started, these connections being made directly upon the line-wire L. For an independent receiver the part of the diagram at the right in Fig. 26 is complete and accurate, it being understood that the clutch-magnet M will then control a shaft arranged in the same manner as shaft H of the machine shown, but carrying no sunflowers.

It will be understood that the form and arrangement of the selecting-magnets and the circuit connections may readily be varied by electricians and that the special construction shown has been selected only as one convenient embodiment of the invention. Thus it is not essential that the selecting-magnets M' M² M³ be separate from the relays; but the latter may act also as the selecting-magnets. Instead of using separate selecting-magnets for the two polarities, moreover, a single magnet and polarized armature may be used, and it will be understood that this well-known equivalent is included within the expression "magnets responding to impulses of different polarities." Other changes will suggest themselves to those skilled in the art.

The invention has been illustrated as applied to a type-writer of one of the common forms in which the impression movement is produced by power exerted by the operator upon the key. It will be understood, however, that the invention may be applied to machines of other forms and that it is especially applicable to machines of that class in which means are provided for actuating the type-bars or other members to be operated by power connections, the movement of the keys simply resulting in the application of the power. It will be understood, also, that while the invention has been designed for use in connection with machines of constructions now in use and is of special value as enabling such machines to be operated telegraphically, transmitting and receiving instruments of a construction especially designed for this use may be employed, and this may be found preferable in large systems. In this case the construction and arrangement of the mechanical features of the apparatus may be simplified, no limitation upon the construction of the apparatus being set by the necessity of adapting it to an existing machine, as in the construction shown.

What is claimed is—

1. The combination of a series of members from which one is to be selected, a series of selectors determining the member to be selected, a magnet controlling said selectors according to the impulses received, and means for sending impulses to said magnet varying in combination with periods of rest according to the member to be selected, substantially as described.

2. The combination of a series of members from which one is to be selected, a plurality of selectors determining the member to be selected, magnets responding to impulses of different strength, each magnet controlling a series of said selectors according to the impulses received, and means for sending impulses to said magnets varying in strength and combination with periods of rest according to the member to be selected, substantially as described.

3. The combination of a series of members from which one is to be selected, a plurality of selectors determining the member to be selected, magnets responding to impulses of different polarities, each magnet controlling a series of said selectors according to the impulses received, and means for sending impulses to said magnets varying in polarity and combination with periods of rest according to the member to be selected, substantially as described.

4. The combination of a series of members from which one is to be selected, a plurality of selectors determining the member to be selected, magnets, each magnet controlling a series of said selectors according to the impulses received, and means for sending impulses to said magnets in combination with periods of rest according to the member to be selected, substantially as described.

5. The combination of a series of members from which one is to be selected, a plurality of selectors determining the member to be selected, magnets responding to impulses of different polarities and different strengths, each magnet controlling a series of selectors according to the impulses received, and means for sending impulses to said magnets varying in polarity, strength and combination with periods of rest according to the member to be selected, substantially as described.

6. A telegraph-receiver having a series of members from which one is to be selected, a series of selectors determining the member to be selected and a magnet controlling said selectors according to the impulses received, in combination with a transmitter for sending impulses to said magnet varying in combination with periods of rest according to the member to be selected, substantially as described.

7. A telegraph-receiver having a series of members from which one is to be selected, a series of selectors the position of which determines the member to be selected, and a magnet controlling the position of said selectors according to the impulses received, in combination with a transmitter for sending impulses to said magnet varying in combination with periods of rest according to the member to be selected, substantially as described.

8. A telegraph-receiver having a series of members from which one is to be selected, a plurality of selectors determining the member to be selected, magnets responding to impulses of different polarities, each magnet controlling a series of said selectors according to the impulses received, in combination with a transmitter for sending impulses to said magnets varying in polarity and combination with periods of rest according to the member to be selected, substantially as described.

9. A telegraph-receiver having a series of members from which one is to be selected, a plurality of selectors determining the member to be selected, magnets responding to impulses of different strengths, each magnet controlling a series of said selectors according to the impulses received, in combination with a transmitter for sending impulses to said magnets varying in strength and combination with periods of rest according to the member to be selected, substantially as described.

10. A telegraph-receiver having a series of members from which one is to be selected, a plurality of selectors determining the member to be selected, magnets responding to impulses of different polarities and different strengths each magnet controlling a series of said selectors according to the impulses received, in combination with a transmitter for sending impulses to said magnets varying in polarity, strength and combination with periods of rest according to the member to be selected, substantially as described.

11. A telegraph-receiver having a series of members from which one is to be selected, a plurality of selectors determining the member to be selected, magnets, each magnet controlling a series of said selectors according to the impulses received, in combination with a transmitter for sending impulses to said magnets varying in combination with periods of rest according to the member to be selected, substantially as described.

12. A telegraph-receiver having a series of members from which one is to be selected, a movable selector-carrier having a plurality of selectors the position of which determines the member to be selected, and a magnet controlling the position of said selectors according to the impulses received and acting on said selectors successively as they are moved by the selector-carrier, in combination with a transmitter for sending impulses to said magnet varying in combination with periods of rest according to the member to be selected, substantially as described.

13. A telegraph-receiver having a series of members from which one is to be selected, a rotating selector-wheel carrying a plurality of selectors the position of which determines the member to be selected, a magnet controlling the position of said selectors according to the impulses received and acting on said selectors successively during the rotation of the selector-wheel, in combination with a transmitter for sending impulses to said magnet varying in combination with periods of rest according to the member to be selected, substantially as described.

14. A telegraph-receiver having a series of members from which one is to be selected, a movable selector-carrier having a plurality of selectors, the position of which determines the member to be selected, a plurality of magnets, each controlling the position of a series of said selectors according to the impulses received and acting on said selectors successively as they are moved by the selector-carrier, in combination with a transmitter for sending impulses to said magnets varying in combination with periods of rest according to the member to be selected, substantially as described.

15. A telegraph-receiver having a series of members from which one is to be selected, a movable selector-carrier having a plurality of selectors, the position of which determines the member to be selected, a plurality of magnets responding respectively to impulses of different polarities and strengths and each controlling the position of a series of said selectors according to the impulses received and acting on said selectors successively as they are moved by the selector-carrier, in combination with a transmitter for sending impulses to said magnets varying in polarity, strength and combination with periods of rest according to the member to be selected, substantially as described.

16. A telegraph-receiver having a series of members one of which is to be selected and actuated, a selector-carrier having a plurality of selectors, devices coacting with said selectors to select the members to be actuated, a magnet controlling the position of a series of said selectors according to the impulses received and acting on said selectors successively as they are moved by the selector-carrier, and mechanism for actuating the selected member after the selectors have returned to normal position, in combination with a transmitter for sending impulses to said magnet varying in combination with periods of rest according to the member to be actuated and controlling the operation of the actuating mechanism, substantially as described.

17. A telegraph-receiver having a series of members one of which is to be selected and actuated, a selector-carrier having a plurality of selectors, devices coacting with said selectors to select the member to be actuated, a magnet controlling the position of a series of said selectors according to the impulses received and acting on said selectors successively as they are moved by the selector-carrier, in combination with a transmitter for sending impulses to said magnet varying in combination with periods of rest according to the member to be actuated, and mechanism for actuating the selected member operating during the selection of the next member to be actuated, substantially as described.

18. A telegraph-receiver having a series of members from which one is to be selected, a selector-wheel carrying a plurality of selectors the position of which determines the character to be printed, a magnet controlling a series of said selectors according to the impulses received, in combination with a transmitter having a sunflower rotating in synchronism with said selector-wheel for sending impulses to said magnet varying in combination with periods of rest, substantially as described.

19. A telegraph-receiver having a series of members from which one is to be selected, a selector-wheel carrying a plurality of selectors the position of which determines the character to be printed, and magnets responding to currents of different polarities, each magnet controlling a series of said selectors according to the impulses received, in combination with a transmitter having a sunflower rotating in synchronism with said selector-wheel for sending impulses to said magnet varying in combination with periods of rest, substantially as described.

20. A telegraph-receiver having a series of members from which one is to be selected, a selector-wheel carrying a plurality of selectors the position of which determines the character to be printed, and a magnet controlling a series of said selectors according to the impulses received, in combination with a transmitter having two sunflowers rotating in synchronism with said selector-wheel for sending impulses from a single battery to said magnet varying in combination with periods of rest, substantially as described.

21. A printing-telegraph receiver having a selector-wheel carrying a plurality of selectors, devices coacting with said selectors to select the character to be printed, a magnet controlling a series of said selectors, and impression mechanism, in combination with a transmitter having a sunflower rotating in synchronism with said selector-wheel for sending to said magnet impulses varying in combination with periods of rest and controlling the impression mechanism, substantially as described.

22. A printing-telegraph receiver having a selector-wheel carrying a plurality of selectors, devices coacting with said selectors to select the character to be printed, magnets responding to currents of different polarities and each controlling a series of said selectors according to the impulses received, and impression mechanism, in combination with a transmitter having a sunflower rotating in synchronism with said selector-wheel for sending impulses to said magnets varying in polarity and in combination with periods of rest, substantially as described.

23. A printing-telegraph receiver having a selector-wheel carrying a plurality of selectors, devices coacting with said selectors to select the character to be printed, magnets responding to currents of different polarities and each controlling a series of said selectors according to the impulses received, in combination with a transmitter having a sunflower rotating in synchronism with said selector-wheel for sending impulses to said magnets varying in polarity and in combination with periods of rest, and impression mechanism operating to print the character selected during the selection of the next character to be printed, substantially as described.

24. A printing-telegraph receiver having a selector-wheel carrying a plurality of selectors, devices coacting with said selectors to select the character to be printed, magnets responding to currents of different polarities and strengths and each controlling a series of said selectors according to the impulses received, and impression mechanism, in combination with a transmitter having a sunflower rotating in synchronism with said selector-wheel for sending impulses to said magnets varying in polarity, strength and in combination with periods of rest, substantially as described.

25. A telegraph-receiver having a series of members from which one is to be selected, a series of selector-bars having portions varying in elevation and selecting the member according to the position of said portions, a series of selectors controlling the position of said selector-bars, and a magnet controlling said selectors according to the impulses received, in combination with a transmitter for sending impulses to said magnet varying in combination with periods of rest according to the member to be selected, substantially as described.

26. A telegraph-receiver having a series of members, from which one is to be selected, a series of sliding selector-bars having portions varying in elevation and selecting the member according to the position of said portions, a series of selectors controlling the position of said selector-bars, and a magnet controlling said selectors according to the impulses received, in combination with a transmitter for sending impulses to said magnet varying in combination with periods of rest according to the member to be selected, substantially as described.

27. A telegraph-receiver having a series of members, from which one is to be selected, a series of selector-bars having portions varying in elevation and selecting the member according to the position of said portions, a series of selectors controlling the position of said selector-bars, magnets responding to impulses of different polarities, each magnet controlling a series of said selectors according to the impulses received, in combination with a transmitter for sending impulses to said magnets varying in polarity and combination with periods of rest according to the member to be selected, substantially as described.

28. A telegraph-receiver having a series of members from which one is to be selected, a series of selector-bars having portions varying in elevation and selecting the member according to the position of said portions, a series of selectors controlling the position of said selector-bars, magnets responding to impulses of different strengths, each magnet controlling a series of said selectors according to the impulses received, in combination with a transmitter for sending impulses to said magnets varying in strength and combination with periods of rest according to the member to be selected, substantially as described.

29. A telegraph-receiver having a series of members from which one is to be selected, a series of selector-bars having portions varying in elevation and selecting the member according to the position of said portions, a series of selectors controlling the position of said selector-bars, magnets responding to impulses of different polarities and strengths, each magnet controlling a series of said selectors according to the impulses received, in combination with a transmitter for sending impulses to said magnets varying in polarity and strength and combination with periods of rest according to the member to be selected, substantially as described.

30. A telegraph-receiver having a series of members from which one is to be selected, a series of selector-bars having portions varying in elevation and selecting the member according to the position of said portions, a movable selector-carrier having a plurality of selectors determining the position of said selector-bars, and a magnet controlling the position of said selectors according to the impulses received and acting on said selectors successively as they are moved by the selector-carrier, in combination with a transmitter for sending impulses to said magnet varying in combination with periods of rest according to the member to be selected, substantially as described.

31. A telegraph-receiver having a series of members from which one is to be selected, a series of selector-bars having portions varying in elevation and selecting the member according to the position of said portions, a rotating selector-wheel having a plurality of selectors determining the position of said selector-bars, and a magnet controlling the position of said selectors according to the impulses received and acting on said selectors successively during the rotation of the selector-wheel, in combination with a transmitter for sending impulses to said magnet varying in combination with periods of rest according to the member to be selected, substantially as described.

32. A telegraph-receiver having a series of members from which one is to be selected, a series of selector-bars having portions varying in elevation and selecting the member according to the position of said portions, a movable selector-carrier having a plurality of selectors determining the position of said selector-bars, and a plurality of magnets each controlling the position of a series of said selectors according to the impulses received and acting on said selectors successively as they are moved by the selector-carrier, in combination with a transmitter for sending impulses to said magnets varying in combination with periods of rest according to the member to be selected, substantially as described.

33. A telegraph-receiver having a series of members from which one is to be selected, a series of selector-bars having portions varying in elevation and selecting the member according to the position of said portions, a movable selector-carrier having a plurality of selectors determining the position of said selector-bars, and a plurality of magnets responding respectively to impulses of different polarities and strength and each controlling the position of a series of said selectors according to the impulses received, and acting on the selectors successively as they are moved by the selector-carrier, in combination with a transmitter for sending impulses to said magnets varying in polarity, strength, and combination with periods of rest, according to the member to be selected, substantially as described.

34. A printing-telegraph receiver having a series of selector-bars provided with portions of different elevation and devices by which the position of said bars determines the character to be printed, impression mechanism, a selector-wheel carrying a plurality of selectors controlling said selector-bars, and a plurality of magnets each controlling a series of said selectors, according to the impulses received, in combination with a transmitter for sending impulses to said magnets varying in combination with periods of rest and controlling the impression mechanism, substantially as described.

35. A printing-telegraph receiver having a series of selector-bars provided with portions of different elevation and devices by which the position of said bars determines the character to be printed, impression mechanism, a selector-wheel carrying a plurality of selectors controlling said selector-bars, and a plurality of magnets each controlling a series of said selectors, according to the impulses received, in combination with a transmitter, having a sunflower rotating in synchronism with said selector-wheel for sending impulses to said magnets varying in combination with periods of rest and controlling the impression mechanism, substantially as described.

36. A printing-telegraph receiver having a series of selector-bars provided with portions of different elevation and devices by which the position of said bars determines the character to be printed, a selector-wheel carrying a plurality of selectors controlling said selector-bars, and a plurality of magnets each controlling a series of said selectors according to the impulses received, in combination with a transmitter for sending impulses to said magnets varying in combination with periods of rest, and impression mechanism operating to print the character selected during the selection of the next character to be printed, substantially as described.

37. A movable selector-carrier having a series of selectors in combination with a controller movable into and out of position to act on said selectors, and a magnet controlling the position of said controller to act on different selectors during the movement of the carrier, according to the impulses received by said magnet, substantially as described.

38. A movable selector-carrier having a plurality of series of selectors, in combination with controllers movable into and out of position to act on said selectors, and magnets controlling the position of said controllers to act on different selectors during the movement of said carrier, according to the impulses received by said magnets, substantially as described.

39. A selector-wheel having a series of selectors arranged at the same distance from the center of the wheel, in combination with a controller movable into and out of position to act on said selectors, and a magnet controlling the position of said controller to act on different selectors during the rotation of said wheel, according to the impulses received by said magnet, substantially as described.

40. A selector-wheel having a plurality of series of selectors, the selectors of each series arranged at the same distance from the center of the wheel, in combination with a controller for each series movable into and out of position to act on said selectors, and magnets controlling said controllers to act on different selectors during the rotation of the wheel according to the impulses received by said magnets, substantially as described.

41. A selector-wheel having a plurality of series of selectors, the selectors of each series arranged at the same distance from the center of the wheel, in combination with a controller for each series movable into and out of position to act on said selectors, magnets controlling said controllers to act on different selectors during the rotation of the wheel according to the impulses received by said magnets, and devices engaging the said selectors during the movement of the wheel to return them to normal position, substantially as described.

42. The combination with a series of keys, of contact-pieces actuated by said keys in different combinations and completing the circuit through the successive segments of a sunflower to send impulses to line in different combinations with periods of rest, a printing-receiver having a magnet controlled by said impulses and selecting devices controlled by the impulses transmitted to said magnet, substantially as described.

43. The combination with a series of keys, of contact-pieces actuated by said keys in different combinations and completing the circuit through the successive segments of sunflowers to send impulses of different polarities and strengths to line, and a printing-receiver having magnets responding to impulses of different polarities and strengths controlled by said impulses, and selecting devices controlled by the impulses transmitted to said magnets, substantially as described.

44. A telegraph-receiver having a series of members from which one is to be selected, a movable selector-carrier having a plurality of selectors, the position of which determines the member to be selected, and a magnet controlling the position of said selectors according to the impulses received and acting on said selectors successively as they are moved by the selector-carrier, in combination with a transmitter for sending impulses to said magnet according to the member to be selected, substantially as described.

45. A telegraph-receiver having a series of members from which one is to be selected, a movable selector-carrier having a plurality of selectors, the position of which determines the member to be selected, a plurality of magnets, each controlling the position of a series of said selectors according to the impulses received and acting on said selectors successively as they are moved by the selector-carrier, in combination with a transmitter for sending impulses to said magnets according to the member to be selected, substantially as described.

46. A telegraph-receiver having a series of members from which one is to be selected, a movable selector-carrier having a plurality of selectors, the position of which determine the member to be selected, a plurality of magnets responding respectively to impulses of different polarities and strengths and each controlling the position of a series of said selectors according to the impulses received and acting on said selectors successively as they are moved by the selector-carrier, in combination with a transmitter for sending impulses to said magnets varying in polarity and strength according to the member to be selected, substantially as described.

47. A telegraph-receiver having a series of members one of which is to be selected and actuated, a selector-carrier having a plurality of selectors, devices coacting with said selectors to select the members to be actuated, a magnet controlling the position of a series of said selectors according to the impulses received and acting on said selectors successively as they are moved by the selector-carrier, and mechanism for actuating the selected member after the selectors have returned to normal position, in combination with a transmitter for sending impulses to said magnet according to the member to be actuated and controlling the operation of the actuating mechanism, substantially as described.

48. A printing-telegraph receiver having a selector-wheel carrying a plurality of selectors, devices coacting with said selectors to select the character to be printed, a magnet controlling a series of said selectors, and impression mechanism, in combination with a transmitter having a sunflower rotating in synchronism with said selector-wheel for sending to said magnet impulses according to the character to be printed and controlling the impression mechanism, substantially as described.

49. A telegraph-receiver having a series of members from which one is to be selected, a series of selector-bars having portions varying in elevation and selecting the member according to the position of said portions, a movable selector-carrier having a plurality of selectors determining the position of said selector-bars, and a plurality of magnets each controlling the position of a series of said selectors according to the impulses received and acting on said selectors successively as they are moved by the selector-carrier, in combination with a transmitter for sending impulses to said magnets according to the member to be selected, substantially as described.

50. A printing-telegraph receiver having a series of selector-bars provided with portions of different elevations and devices by which the position of said bars determines the character to be printed, impression mechanism, a selector-wheel carrying a plurality of selectors controlling said selector-bars, and a plurality of magnets each controlling a series of said selectors according to the impulses received, in combination with a transmitter for sending impulses to said magnets according to the character to be printed and controlling the impression mechanism, substantially as described.

51. A telegraph-receiver having a series of members from which one is to be selected, a selector-carrier carrying a plurality of selectors the position of which determines the member to be selected, and a magnet controlling a series of said selectors according to the impulses received, in combination with a transmitter having a sunflower moving in synchronism with said selector-carrier for sending to said magnet combinations of impulses, each successive impulse of each combination being of greater duration than the preceding one, substantially as described.

52. The combination with a selector-carrier, and one or more magnets controlling the selectors, of a sunflower moving in synchronism with said selector-carrier for sending impulses to said magnet or magnets and having transmitting-segments of successively-increasing length, substantially as described.

53. The combination with a telegraph-transmitter having a sunflower with transmitting-segments of successively-increasing length, of a telegraph-receiver having a member moving in synchronism with said sunflower, and one or more magnets coacting with said member and receiving impulses through said sunflower, substantially as described.

54. A telegraph-receiver having a series of members from which one is to be selected, a selector-carrier carrying a plurality of selectors the position of which determines the character to be printed, and a magnet controlling a series of said selectors according to the impulses received, in combination with a transmitter having two sunflowers moving in synchronism with said selector-carrier for sending impulses from a single battery to said magnet varying in polarity, substantially as described.

55. The combination with a telegraph-receiver and a keyboard-transmitter, of a switch normally closing a short circuit around the transmitter and actuated on the actuation of any one of the keys to break the short circuit and establish a circuit between the receiver and the transmitter, and a cut-out breaking the circuit between the receiver and transmitter after the completion of the operation produced by the key, substantially as described.

56. The combination with a telegraph-receiver and a keyboard-transmitter, of a switch $h$ and main-line contact $c^{14}$ and shunt-contact $c^8$ with both of which the switch normally makes contact, means for moving the switch to break contact $c^8$ on the actuation of a key, and a trip engaging the switch to break contact $c^{14}$ after the completion of the operation produced by the key if the key has not been released and from which trip the switch is disengaged on the release of the key, substantially as described.

57. In a keyboard telegraph-transmitter, the combination with a rotary member connected to the driver by a friction-clutch, and a stop normally holding said member stationary, of a magnet controlling said stop, and a switch shifted at each depression of a key to energize said magnet and withdraw said stop, substantially as described.

58. In a keyboard telegraph-transmitter, the combination with a rotary member connected to the driver by a friction-clutch, and a stop normally holding said member stationary against the driver, of a magnet controlling said stop, a switch shifted at each depression of a key to energize said magnet to withdraw the stop, and means for throwing said magnet out of circuit during the rotation of the rotary member, substantially as described.

59. The combination of a telegraph-receiver and a telegraph-transmitter having members rotating in unison, magnets controlling the connection of said members with their drivers and energized to secure the movement of the shafts when the transmitter is actuated, means for throwing said magnets out of circuit when the rotary members are moved out of normal position, and means for disconnecting the members from their drivers at a certain point after each actuation of the transmitter, substantially as described.

60. A telegraph-receiver having a rotating member, a clutch for connecting said member to the driver, a switch for disconnecting said member from the driver at the end of each rotation, and a magnet controlling the connection and energized to connect the rotating member to its driver for the next rotation, substantially as described.

61. A telegraph-receiver having a rotating member, a clutch for connecting said member to the driver, means for disconnecting said member from the driver at the end of each rotation, a magnet controlling the connection and energized to connect the rotary member to the driver for each rotation, and means for throwing said magnet out of circuit when the rotary member is moved out of normal position, substantially as described.

62. The combination with a printing-telegraph receiver actuated by combinations of electric impulses and having a case-shift actuated by impulses of certain strength, of a transmitter having a series of keys, and a shifting member by which the strength of an impulse of the combinations as sent by the normal operation of the transmitter is varied to actuate the case-shift, substantially as described.

63. The combination with a printing-telegraph receiver actuated by combinations of electric impulses and having a case-shift actuated by impulses of a certain polarity, of a transmitter having a series of keys, and a shifting member by which the polarity of an impulse of the combinations as sent by the normal operation of the transmitter is varied to actuate the case-shift, substantially as described.

64. The combination with a printing-telegraph receiver actuated by combinations of electric impulses of different polarities and strength and having a double case-shift actuated by an impulse of a certain strength and either polarity, of a transmitter having a series of keys and a shifting member by which the strength or the strength and polarity of an impulse of the combinations as sent by the normal operation of the transmitter may be varied to actuate the case-shift for either case, substantially as described.

65. The combination with a printing-telegraph receiver actuated by combinations of electric impulses and having a case-shift actuated by first impulses of a certain strength, of a transmitter having a series of keys and a shifting member by which the strength of the first impulse of a combination is varied to actuate the case-shift, substantially as described.

66. The combination with a printing-telegraph receiver actuated by combinations of electric impulses and having a case-shift actuated by first impulses of a certain polarity, of a transmitter having a series of keys, and a shifting member by which the polarity of the first impulse of a combination is varied to acturte the case-shift, substantially as described.

67. The combination with a printing-telegraph receiver actuated by combinations of electric impulses of different polarities and strengths and having a double case-shift actuated by first impulses of a certain strength and either polarity, of a transmitter having a series of keys and a shifting member by which the strength or the strength and polarity of the first impulse of a combination as sent by the normal operation of the transmitter may be varied to actuate the case-shift for either case, substantially as described.

68. The combination with a local circuit, of a line-magnet having an armature forming a contact in the local circuit, and a moving cut-out closing the circuit after the armature-contact is closed, substantially as described.

69. The combination with a telegraph-receiver having a rotating member and actuated by a series of electric impulses in a local circuit during the rotation of said member, of a line-magnet having an armature forming a contact in the local circuit, and a rotating cut-out closing the circuit in the normal position of the rotating member, and closing the circuit for the second and subsequent impulses during a rotation of the rotating member after the armature-contact is closed, substantially as described.

70. The combination with a telegraph-receiver having a rotating member and actuated by a series of electric impulses during the rotation of said member, of a transmitter having a member rotating in synchronism with the rotating member of the transmitter, and a rotating cut-out making a short close of the receiver-circuit, substantially as described.

71. The combination with a telegraph-transmitter having a sunflower, of a receiver actuated by electric impulses transmitted through the successive sections of the sunflower and having a member rotating in synchronism therewith and a cut-out making a short close of the receiver-circuit, substantially as described.

72. The combination with a telegraph-transmitter having a sunflower, of a receiver having a selector-wheel rotating in synchronism therewith, a series of selectors carried by said wheel and corresponding with the sunflower-sections, a controller acting on said selectors as they are carried past the controller by the selector-wheel, a magnet controlling said controller, and a cut-out rotating with the selector-wheel and making a short close of the magnet-circuit as the selectors to be acted on reach the controller, substantially as described.

73. The combination with a telegraph-receiver having a carriage, a rotating member, a member normally free to rotate independently of the rotating member and connected to the carriage by a cord or similar device, and a clutch, of a transmitter, and means controlled from said transmitter for actuating said clutch to connect said member for the return of the carriage, substantially as described.

74. The combination with a telegraph-receiver having a carriage, a rotating member, a member normally free to rotate independently of the rotating member and connected to the carriage by a cord or similar device, and a clutch, of a transmitter, and means controlled from said transmitter for actuating said clutch to connect said member for the return of the carriage, and means for releasing the clutch by the return of the carriage, substantially as described.

75. The combination with a carriage, a rotating member, a member normally free to rotate independently of the rotating member and connected to the carriage by a cord or similar device, and a clutch, of a sliding member actuating said clutch to connect said members for the return of the carriage, and a trip on said cord by which the sliding member is shifted for the release of the clutch when the carriage has been returned, substantially as described.

76. The combination with a selector-wheel having a plurality of series of selectors, as $s'$, $s^2$, &c., mounted to move longitudinally of the selector-wheel, the selectors of each series arranged at the same distance from the center of the wheel, of a controller, as $m'$, $m^2$, &c., for each series, and magnets controlling said controllers, substantially as described.

77. The combination with a selector-wheel having a plurality of series of selectors, as $s'$, $s^2$, &c., mounted to move longitudinally of the selector-wheel, the selectors of each series arranged at the same distance from the center of the wheel, of a controller, as $m'$, $m^2$, &c., for each series having a cam-face to engage the selectors, and magnets controlling said controllers, substantially as described.

78. The combination with a series of sliding selector-bars, and a selector-wheel having a series of selectors controlling the position of said selector-bars, of a return-bar 72 for said selector-bars actuated by the selector-wheel, substantially as described.

79. A telegraph-receiver having a rotating member, a clutch for connecting said member to the driver, a detent for said member, a magnet controlling said detent to release said member, and means for throwing said magnet out of circuit when the member is moved out of normal position and before the completion of its movement, substantially as described.

In testimony whereof I have hereunto set my hand in the presence of two subscribing witnesses.

JOHN BURRY.

Witnesses:
T. T. KEHOE,
C. J. SAWYER.

---

Corrections in Letters Patent No. 811,127.

It is hereby certified that in Letters Patent No. 811,127, granted January 30, 1906, upon the application of John Burry, of New York, N. Y., for an improvement in "Telegraphy and Telegraph Apparatus," an error appears in the printed specification requiring correction, as follows: In line 79, page 12, the word "shafts" should read *shifts;* and that the said Letters Patent should be read with this correction therein that the same may conform to the record of the case in the Patent Office.

Signed and sealed this 13th day of March, A. D., 1906.

[SEAL.]

E. B. MOORE,
*Acting Commissioner of Patents.* lectors as they are carried past the controller by the selector-wheel, a magnet controlling said controller, and a cut-out rotating with the selector-wheel and making a short close of the magnet-circuit as the selectors to be acted on reach the controller, substantially as described.

73. The combination with a telegraph-receiver having a carriage, a rotating member, a member normally free to rotate independently of the rotating member and connected to the carriage by a cord or similar device, and a clutch, of a transmitter, and means controlled from said transmitter for actuating said clutch to connect said member for the return of the carriage, substantially as described.

74. The combination with a telegraph-receiver having a carriage, a rotating member, a member normally free to rotate independently of the rotating member and connected to the carriage by a cord or similar device, and a clutch, of a transmitter, and means controlled from said transmitter for actuating said clutch to connect said member for the return of the carriage, and means for releasing the clutch by the return of the carriage, substantially as described.

75. The combination with a carriage, a rotating member, a member normally free to rotate independently of the rotating member and connected to the carriage by a cord or similar device, and a clutch, of a sliding member actuating said clutch to connect said members for the return of the carriage, and a trip on said cord by which the sliding member is shifted for the release of the clutch when the carriage has been returned, substantially as described.

76. The combination with a selector-wheel having a plurality of series of selectors, as $s'$, $s^2$, &c., mounted to move longitudinally of the selector-wheel, the selectors of each series arranged at the same distance from the center of the wheel, of a controller, as $m'$, $m^2$, &c., for each series, and magnets controlling said controllers, substantially as described.

77. The combination with a selector-wheel having a plurality of series of selectors, as $s'$, $s^2$, &c., mounted to move longitudinally of the selector-wheel, the selectors of each series arranged at the same distance from the center of the wheel, of a controller, as $m'$, $m^2$, &c., for each series having a cam-face to engage the selectors, and magnets controlling said controllers, substantially as described.

78. The combination with a series of sliding selector-bars, and a selector-wheel having a series of selectors controlling the position of said selector-bars, of a return-bar 72 for said selector-bars actuated by the selector-wheel, substantially as described.

79. A telegraph-receiver having a rotating member, a clutch for connecting said member to the driver, a detent for said member, a magnet controlling said detent to release said member, and means for throwing said magnet out of circuit when the member is moved out of normal position and before the completion of its movement, substantially as described.

In testimony whereof I have hereunto set my hand in the presence of two subscribing witnesses.

JOHN BURRY.

Witnesses:
T. T. KEHOE,
C. J. SAWYER.

---

It is hereby certified that in Letters Patent No. 811,127, granted January 30, 1906, upon the application of John Burry, of New York, N. Y., for an improvement in "Telegraphy and Telegraph Apparatus," an error appears in the printed specification requiring correction, as follows: In line 79, page 12, the word "shafts" should read *shifts;* and that the said Letters Patent should be read with this correction therein that the same may conform to the record of the case in the Patent Office.

Signed and sealed this 13th day of March, A. D., 1906.

[SEAL.]

E. B. MOORE,
*Acting Commissioner of Patents.*

It is hereby certified that in Letters Patent No. 811,127, granted January 30, 1906, upon the application of John Burry, of New York, N. Y., for an improvement in "Telegraphy and Telegraph Apparatus," an error appears in the printed specification requiring correction, as follows: In line 79, page 12, the word "shafts" should read *shifts;* and that the said Letters Patent should be read with this correction therein that the same may conform to the record of the case in the Patent Office.

Signed and sealed this 13th day of March, A. D., 1906.

[SEAL.]

E. B. MOORE,
*Acting Commissioner of Patents.*